US009148701B2

(12) United States Patent
Craner et al.

(10) Patent No.: US 9,148,701 B2
(45) Date of Patent: *Sep. 29, 2015

(54) SYSTEMS AND METHODS FOR RANKING ASSETS RELATIVE TO A GROUP OF VIEWERS

(71) Applicant: Rovi Guides, Inc., Santa Clara, CA (US)

(72) Inventors: Michael L. Craner, Chester Springs, PA (US); John W. Baxter, Richboro, PA (US)

(73) Assignee: Rovi Guides, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/940,597

(22) Filed: Jul. 12, 2013

(65) Prior Publication Data

US 2013/0305290 A1    Nov. 14, 2013

Related U.S. Application Data

(63) Continuation of application No. 12/163,001, filed on Jun. 27, 2008, now Pat. No. 8,510,778.

(51) Int. Cl.
*G06F 3/00* (2006.01)
*H04N 21/466* (2011.01)
(Continued)

(52) U.S. Cl.
CPC ...... *H04N 21/4661* (2013.01); *G06F 17/30997* (2013.01); *H04N 21/44213* (2013.01); *H04N 21/44222* (2013.01); *H04N 21/4532* (2013.01);
(Continued)

(58) Field of Classification Search
CPC .................. H04N 21/4661; H04N 21/44213; H04N 21/44222; H04N 21/4532; H04N 41/466; H04N 21/4667; H04N 21/4668; G06F 17/30997

USPC .................................................... 725/46, 11
See application file for complete search history.

(56) References Cited

U.S. PATENT DOCUMENTS 2,700,065 A    1/1955   Evans
2,851,550 A    9/1958   Searcy
(Continued)

FOREIGN PATENT DOCUMENTS

AU    21592/88    3/1989
FR    2 678 091    12/1992
(Continued)

OTHER PUBLICATIONS

"Addressable Converters: A New Development at Cable Data," Via Cable, vol. 1, No. 12, Dec. 1981, Cable Data, Sacramento, California.
(Continued)

*Primary Examiner* — Hoang-Vu A Nguyen-Ba
(74) *Attorney, Agent, or Firm* — Ropes & Gray LLP

(57) ABSTRACT

Systems and methods are provided for ranking assets relative to a group of viewers. A group is formed by a user by selecting a number of different viewer preference profiles or automatically by the system as a function of analyzing similarities among viewer preference profiles. Individual preference values are computed for each viewer in the group relative to an asset. A group preference value is then computed by performing a function on the individual preference values. A display is generated that represents the individual preference values and the group preference value relative to an asset. Based on the information provided in the display, the asset most relevant to the group may be selected.

20 Claims, 11 Drawing Sheets

(51) Int. Cl.
  *H04N 21/442*  (2011.01)
  *H04N 21/45*  (2011.01)
  *G06F 17/30*  (2006.01)
  *G06F 13/00*  (2006.01)

(52) U.S. Cl.
  CPC ......... *H04N 21/466* (2013.01); *H04N 21/4667* (2013.01); *H04N 21/4668* (2013.01)

(56) References Cited

U.S. PATENT DOCUMENTS

| | | |
|---|---|---|
| 2,856,474 A | 10/1958 | Norris |
| 3,879,332 A | 4/1975 | Leone |
| 4,012,583 A | 3/1977 | Kramer |
| 4,015,139 A | 3/1977 | Cleary et al. |
| 4,079,419 A | 3/1978 | Siegle et al. |
| 4,081,753 A | 3/1978 | Miller |
| 4,081,754 A | 3/1978 | Jackson |
| 4,156,850 A | 5/1979 | Beyers, Jr. |
| 4,162,513 A | 7/1979 | Beyers, Jr. et al. |
| 4,163,254 A | 7/1979 | Block et al. |
| 4,167,658 A | 9/1979 | Sherman |
| 4,170,782 A | 10/1979 | Miller |
| 4,225,884 A | 9/1980 | Block et al. |
| 4,228,543 A | 10/1980 | Jackson |
| 4,246,495 A | 1/1981 | Pressman |
| 4,247,743 A | 1/1981 | Hinton et al. |
| 4,288,809 A | 9/1981 | Yabe |
| 4,305,101 A | 12/1981 | Yarbrough et al. |
| 4,321,593 A | 3/1982 | Ho et al. |
| 4,348,696 A | 9/1982 | Beier |
| 4,355,415 A | 10/1982 | George et al. |
| 4,390,901 A | 6/1983 | Keiser |
| 4,425,579 A | 1/1984 | Merrell |
| 4,429,385 A | 1/1984 | Cichelli et al. |
| 4,482,789 A | 11/1984 | McVey |
| 4,484,217 A | 11/1984 | Block et al. |
| 4,484,220 A | 11/1984 | Beetner |
| 4,488,179 A | 12/1984 | Kru/ger et al. |
| 4,488,764 A | 12/1984 | Pfenning et al. |
| 4,495,654 A | 1/1985 | Deiss |
| 4,510,623 A | 4/1985 | Bonneau et al. |
| 4,528,589 A | 7/1985 | Block et al. |
| 4,536,791 A | 8/1985 | Campbell et al. |
| 4,566,033 A | 1/1986 | Reidenouer |
| 4,573,072 A | 2/1986 | Freeman |
| 4,588,901 A | 5/1986 | Maclay et al. |
| 4,598,288 A | 7/1986 | Yarbrough et al. |
| 4,604,708 A | 8/1986 | Lewis |
| 4,605,964 A | 8/1986 | Chard |
| 4,605,973 A | 8/1986 | Von Kohorn |
| 4,620,229 A | 10/1986 | Amano et al. |
| 4,636,595 A | 1/1987 | Smock et al. |
| 4,647,735 A | 3/1987 | Sicher |
| 4,648,667 A | 3/1987 | Baumgart |
| 4,685,131 A | 8/1987 | Horne |
| 4,718,107 A | 1/1988 | Hayes |
| 4,750,213 A | 6/1988 | Novak |
| 4,768,229 A | 8/1988 | Benjamin et al. |
| 4,807,023 A | 2/1989 | Bestler et al. |
| 4,809,393 A | 3/1989 | Goodrich et al. |
| 4,823,385 A | 4/1989 | Hegendorfer |
| 4,855,611 A | 8/1989 | Isobe et al. |
| 4,862,268 A | 8/1989 | Campbell et al. |
| 4,885,775 A | 12/1989 | Lucas |
| 4,888,796 A | 12/1989 | Olivo, Jr. |
| 4,890,320 A | 12/1989 | Monslow et al. |
| 4,890,321 A | 12/1989 | Seth-Smith et al. |
| 4,903,031 A | 2/1990 | Yamada |
| 4,930,158 A | 5/1990 | Vogel |
| 4,930,160 A | 5/1990 | Vogel |
| 4,994,908 A | 2/1991 | Kuban et al. |
| 4,995,078 A | 2/1991 | Monslow et al. |
| 5,001,554 A | 3/1991 | Johnson et al. |
| 5,021,916 A | 6/1991 | Hubbard |
| 5,033,085 A | 7/1991 | Rew |
| 5,038,211 A | 8/1991 | Hallenbeck |
| 5,045,947 A | 9/1991 | Beery |
| 5,046,125 A | 9/1991 | Takizawa |
| 5,051,837 A | 9/1991 | McJunkin |
| 5,053,797 A | 10/1991 | Samuels et al. |
| 5,053,884 A | 10/1991 | Kamijyo |
| 5,056,139 A | 10/1991 | Littlefield |
| 5,068,734 A | 11/1991 | Beery |
| 5,075,771 A | 12/1991 | Hashimoto |
| 5,168,353 A | 12/1992 | Walker et al. |
| 5,172,111 A | 12/1992 | Olivo, Jr. |
| 5,206,722 A | 4/1993 | Kwan |
| 5,210,611 A | 5/1993 | Yee et al. |
| 5,223,924 A | 6/1993 | Strubbe |
| 5,231,310 A | 7/1993 | Oh |
| 5,235,415 A | 8/1993 | Bonicel et al. |
| 5,247,364 A | 9/1993 | Banker et al. |
| 5,253,066 A | 10/1993 | Vogel |
| 5,253,067 A | 10/1993 | Chaney et al. |
| 5,260,778 A | 11/1993 | Kauffman et al. |
| 5,303,063 A | 4/1994 | Kim et al. |
| 5,317,391 A | 5/1994 | Banker et al. |
| 5,357,276 A | 10/1994 | Banker et al. |
| 5,371,795 A | 12/1994 | Vogel |
| 5,382,983 A | 1/1995 | Kwoh et al. |
| 5,384,910 A | 1/1995 | Torres |
| 5,396,546 A | 3/1995 | Remillard |
| 5,425,101 A | 6/1995 | Woo et al. |
| 5,446,488 A | 8/1995 | Vogel |
| 5,465,113 A | 11/1995 | Gilboy |
| 5,477,262 A | 12/1995 | Banker et al. |
| 5,485,221 A | 1/1996 | Banker et al. |
| 5,485,518 A | 1/1996 | Hunter et al. |
| 5,548,345 A | 8/1996 | Brian et al. |
| 5,550,575 A | 8/1996 | West et al. |
| 5,557,724 A | 9/1996 | Sampat et al. |
| 5,579,055 A | 11/1996 | Hamilton et al. |
| 5,583,560 A | 12/1996 | Florin et al. |
| 5,583,576 A | 12/1996 | Perlman et al. |
| 5,585,866 A | 12/1996 | Miller et al. |
| 5,589,892 A | 12/1996 | Knee et al. |
| 5,592,551 A | 1/1997 | Lett et al. |
| 5,594,509 A | 1/1997 | Florin et al. |
| 5,621,456 A | 4/1997 | Florin et al. |
| 5,629,733 A | 5/1997 | Youman et al. |
| 5,664,046 A | 9/1997 | Abecassis |
| 5,699,104 A | 12/1997 | Yoshinobu |
| 5,716,273 A | 2/1998 | Yuen |
| 5,751,335 A | 5/1998 | Shintani |
| 5,781,246 A | 7/1998 | Alten et al. |
| 5,907,831 A | 5/1999 | Lotvin et al. |
| 5,949,471 A | 9/1999 | Yuen et al. |
| 5,969,748 A | 10/1999 | Casement et al. |
| 6,072,520 A | 6/2000 | Yuen et al. |
| 6,115,057 A | 9/2000 | Kwoh et al. |
| 6,144,401 A | 11/2000 | Casement et al. |
| 6,321,381 B1 | 11/2001 | Yuen et al. |
| 6,698,019 B1 | 2/2004 | Kim et al. |
| 6,744,967 B2 | 6/2004 | Kaminski et al. |
| 6,767,212 B2 | 7/2004 | Thomas |
| 6,850,691 B1 | 2/2005 | Stam et al. |
| 6,922,843 B1 | 7/2005 | Herrington et al. |
| 7,130,616 B2 | 10/2006 | Janik |
| 7,185,355 B1 | 2/2007 | Ellis et al. |
| 7,305,436 B2 | 12/2007 | Willis |
| 7,320,025 B1 | 1/2008 | Steinberg et al. |
| 7,396,281 B2 | 7/2008 | Mendelsohn et al. |
| 7,716,704 B2 | 5/2010 | Wang et al. |
| 2002/0016971 A1 | 2/2002 | Berezowski et al. |
| 2002/0095673 A1 | 7/2002 | Leung et al. |
| 2002/0122052 A1 | 9/2002 | Reich et al. |
| 2002/0174428 A1 | 11/2002 | Agnihotri et al. |
| 2003/0103079 A1 | 6/2003 | Adatia et al. |
| 2003/0115593 A1 | 6/2003 | Alten et al. |
| 2003/0146915 A1 | 8/2003 | Brook et al. |
| 2003/0149980 A1 | 8/2003 | Hassell et al. |
| 2003/0149988 A1 | 8/2003 | Ellis et al. |
| 2003/0237088 A1 | 12/2003 | Macrae et al. |

(56) References Cited

U.S. PATENT DOCUMENTS

| | | |
|---|---|---|
| 2003/0237093 A1 | 12/2003 | Marsh |
| 2004/0019903 A1 | 1/2004 | Knudson et al. |
| 2004/0060063 A1 | 3/2004 | Russ et al. |
| 2004/0075694 A1 | 4/2004 | Partridge et al. |
| 2004/0098744 A1 | 5/2004 | Gutta |
| 2004/0103434 A1 | 5/2004 | Ellis |
| 2004/0128681 A1 | 7/2004 | Hancock et al. |
| 2004/0199923 A1 | 10/2004 | Russek |
| 2004/0215718 A1 | 10/2004 | Kazmi et al. |
| 2005/0005308 A1 | 1/2005 | Logan et al. |
| 2005/0114374 A1 | 5/2005 | Juszkiewicz et al. |
| 2005/0125822 A1 | 6/2005 | Casement et al. |
| 2005/0147247 A1 | 7/2005 | Westberg et al. |
| 2005/0154988 A1 | 7/2005 | Proehl et al. |
| 2005/0166230 A1 | 7/2005 | Gaydou et al. |
| 2005/0177846 A1 | 8/2005 | Maruyama et al. |
| 2005/0246738 A1 | 11/2005 | Lockett et al. |
| 2006/0020662 A1 | 1/2006 | Robinson |
| 2006/0112082 A1 | 5/2006 | Platt et al. |
| 2006/0267995 A1 | 11/2006 | Radloff et al. |
| 2007/0028267 A1 | 2/2007 | Ostojic et al. |
| 2007/0186241 A1 | 8/2007 | Sugimoto et al. |
| 2007/0204287 A1 | 8/2007 | Conradt et al. |
| 2007/0300184 A1 | 12/2007 | Song |
| 2009/0133090 A1 | 5/2009 | Busse |

FOREIGN PATENT DOCUMENTS

| | | |
|---|---|---|
| GB | 2 209 417 | 5/1989 |
| GB | 2 210 526 | 6/1989 |
| GB | 2 215 928 | 9/1989 |
| WO | WO-86/01962 | 3/1986 |
| WO | WO-89/12370 | 12/1989 |
| WO | WO-90/15507 | 12/1990 |
| WO | WO-93/11638 | 6/1993 |
| WO | WO-93/11639 | 6/1993 |
| WO | WO-93/11640 | 6/1993 |
| WO | WO-00/59214 | 10/2000 |

OTHER PUBLICATIONS

Brugliera, Vito, "Digital On-Screen Display—A New Technology for the Consumer Interface," Symposium Record Cable Sessions of the 18th International Television Symposium & Technical Exhibition, Jun. 1993, pp. 571-586.

CableComputer User's Guide, bearing a date of Dec. 1985 (Plaintiffs Exhibit 289).

CableData, Roseville Consumer Presentation, Mar. 1986.

Committee on Commerce, "Communications Act of 1995," XP-002100790 Jul. 1995, pp. 1-4.

Daniel F. Walsh Jr., Timing Considerations in RF Two Way Data Collection and Polling, Jerrold-Applies Media Lab, 1989 NCTA Technical Papers, pp. 47-56, 1989.

Daniel H. Smart, Innovative Aspects of a Switched Star Cabled Television Distribution System, British Cable Services Limited, 1987 NCTA Technical Papers, pp. 26-35, 1987.

Federal Communications Commission, In the Telecommunications Act of 1996, Public Law 104-104, effective Feb. 8, 1996, in Section 551, "Parental Choice in Television Programming," XP-002100791.

Gary Libman, Times Staff Writer Chaining the Channels, A New Generation of Television Blocking Systems Allows More Options for Parent, Seeking to Control Kids' Viewing, Los Angeles Times, Aug. 9, 1993.

Gregory F. Vaeth, John Feras, Enertec, Inc., The Addressable Controller of the Future, *General Instruments/Jerrold Communication*, 1990 NCTA Technical Papers, pp. 274-279, 1990.

ISO/TC 46/SC 9: Additional Revision to ISO/CD 15706, ISAN, Oct. 5, 1999, Video Standards and Drafts.

Jerrold Communications Publication, "Cable Television Equipment," dated 1992 and 1993, pp. 8-2.1 to 8-6 and 8-14.1 to 8-14.3.

M/A-COM, Inc., "Videocipher II Satellite Descrambler Owner's Manual," dated prior to Feb. 1986.

Michael Dufresne, "New Services: An Integrated Cable Network's Approach, Videotron Communication LTEE," *Technical Papers of NCTA 31st Annual Convention & Exposition*, pp. 156-160 (1982).

Richard G. Merrell, Mack S. Daily, An Auto-Dialer Approach to Pay-Per-View Purchasing, Zenith Electronics Corporation, Glenview, Illinois, 1989 NCTA Technical Papers, pp. 34-38, 1989.

Roisin, C., "Authoring Structured Multimedia Documents", SOFSEM: Theory and Practice of Informatics, Conference on Current Trends in Theory and Practice of Informatics, Proceedings, XX, Nov. 21, 1998, pp. 222-239 Abstract.

Roseville City Council Presentation, bearing a date of Mar. 13, 1985 (Defendant's Exhibit 26).

Sezan, I et al., "TV Anytime Forum Metadata Requirements", Mar. 10, 2000, Video Standards and Drafts.

*StarSight Telecast Inc. User's Guide,* pp. 1-20 (1994).

T. Rzeszewski et al., "A Microcomputer Controlled Frequency Synthesizer for TV." Reprinted from *IEEE Trans. Consum. Electron,* vol. CE-24, pp. 145-153 (1978).

"Weststar and Videotoken Network Present the CableComputer" (Plaintiffs Exhibit 334 dated Sep. 19, 1995).

International Search Report dated Apr. 5, 2010 from corresponding PCT Application No. PCT/US09/03759.

500

Profile Data Structure

510 — <name>"Stewie"</name>
520 — <icon> Stewie. ico </icon>
<priority> high </priority>
530 — <genre1> SciF
    <sex> 7.8 </sex>
532 — <violence> 6.6 </violence>
    <language> 2.9 </language>
534 — <hard_limit> 6 </hard_limit>
    <rating> 8 </rating>
    <parental_control> no </parental_control>
</genre1>
<genre2> comedy
    ⋮
</genre2>
    ⋮

Asset Characteristics

610 — `<title>"Gladiator"</title>`
620 — `<duration> 2.5 hours </duration>`
630 — `<sex> 1.2 </sex>`
640 — `<genre> action </genre>`
`<violence> 9 </violence>`
`<language> 7 </language>`
`<rating> 8 </rating>`
`<parental_control> yes </parental_control>`

FIG. 6

SYSTEMS AND METHODS FOR RANKING ASSETS RELATIVE TO A GROUP OF VIEWERS

CROSS-REFERENCE TO RELATED APPLICATIONS

This application is a continuation application of U.S. patent application Ser. No. 12/163,001, filed Jun. 27, 2008. The aforementioned, earlier-filed application is hereby incorporated by reference herein in its entirety.

BACKGROUND OF THE INVENTION

The invention is directed to systems and methods for using an interactive media guidance application, and more particularly to using the interactive media guidance application to rank assets relative to a group of viewers.

Conventional systems allow users to specify their interest level in various media assets. For example, a user may specify his or her interest in a television program using a "thumbs up" and "thumbs down" approach which the systems use to rank the television programs. But such systems lack the capability to consider multiple viewers when ranking assets. In particular, it is usually multiple users (i.e., a group of viewers or a family) with different preferences relating to asset characteristics that wish to access a particular asset at the same time. For example, a family may gather together on a Friday for a family movie viewing night. However, because each member of the family has different asset preference characteristics, an asset ranked by conventional systems as very relevant for one user, may actually have little or no relevance to another user. Therefore, the family preferences will not be matched causing one member of the family to not enjoy accessing (e.g., watching) the asset with the rest of the family.

Accordingly, it is desirable to provide enhanced systems and methods for ranking assets relative to a group of viewers.

SUMMARY OF THE INVENTION

In accordance with the principles of the present invention, systems and methods are provided for ranking assets relative to a group of viewers.

A user may interact with a system to select a number of viewers that are to become members of a group. Each viewer may have a preference profile that defines that viewer's particular preferences stored locally or remotely.

Once the group is defined, the system performs a search for assets that match the viewing preferences of all of the members of the group. For example, the system may retrieve preference profile data structures associated with each member in the group. The system may compute an individual preference value by measuring a Euclidean distance between each viewer's preferences and a particular asset's characteristics defined in an asset characteristics data structure that correspond to those preferences. Each individual preference value may be stored locally or remotely to a memory.

The system may retrieve the individual preference values from a memory and perform a function on the individual preference values to compute a group preference value for a particular asset. For example, the function the system performs may be a sum, a vector sum, a difference, a Euclidean distance, a multidimensional centroid or middleground, or any other suitable measure relative to a group. The group preference value may be stored in a local or remote memory of the system.

The system may retrieve the individual preference values and the group preference value for each asset and generate a display representing at least the plurality of individual preference values and the group preference value. For example, the display may include an indicator that is partitioned according to the number of viewers in a particular group. The indicator may indicate both the individual preference values associated with the asset and the group preference value associated with the asset.

The indicators, provided in the display, allow each viewer to see which asset the whole group of viewers likes/dislikes the most, or perhaps that a particular viewer in the group may dislike the asset identified by the system as being most relevant to the group. Additionally, the system may identify which viewer in the group is likely to dislike the most relevant asset and provide information about why that particular asset is ranked as most relevant to the group. In some embodiments, the viewers in the group have priority designations which may affect the ranking of the assets. Thus, when two viewers, A and B, are in a group where A has a higher priority designation than B, the system will rank an asset that may not be particularly relevant to B as being relevant to the group because the asset may be strongly relevant to A. The displayed indicators convey such information to the group allowing viewer B to visually perceive (e.g., by way of visually identifying both the relevance of the asset to viewer A and that viewer's priority designation) why an asset is very relevant to the group even though the asset has little relevance to viewer B.

In some embodiments, the indicator may be a horizontal bar having a particular length that represents the group preference value. A user may determine the relevance of a particular asset to the group by comparing the total length of the bar corresponding to one asset with the total length of another bar that corresponds to a different asset. The bar may be partitioned into sections each having a length that corresponds to the individual preference values of the members of the group. A user may determine the relevance of a particular asset to one member of the group by comparing the length of the section corresponding to that member with the length of a section of the bar corresponding to other members of the group. In some aspects of the invention, the length of the bar is directly proportional to the relevance of the asset. Alternatively, the length of the bar may be inversely proportional to the relevance of the asset.

In some embodiments, the system may suggest a particular asset that is most relevant to the group. The system may determine the most relevant asset by accounting for individual viewer's priority designations, various alerts associated with parental controls or hard limits set for different viewer preferences in the viewer profile that are/are not exceeded.

BRIEF DESCRIPTION OF THE DRAWINGS

The above and other features of the present invention, its nature and various advantages will be more apparent upon consideration of the following detailed description, taken in conjunction with the accompanying drawings in which:

FIG. 5 shows an illustrative preference profile data structure in accordance with an embodiment of the present invention;

FIG. 6 shows an illustrative asset characteristics data structure in accordance with an embodiment of the present invention;

DETAILED DESCRIPTION

Figure 1:
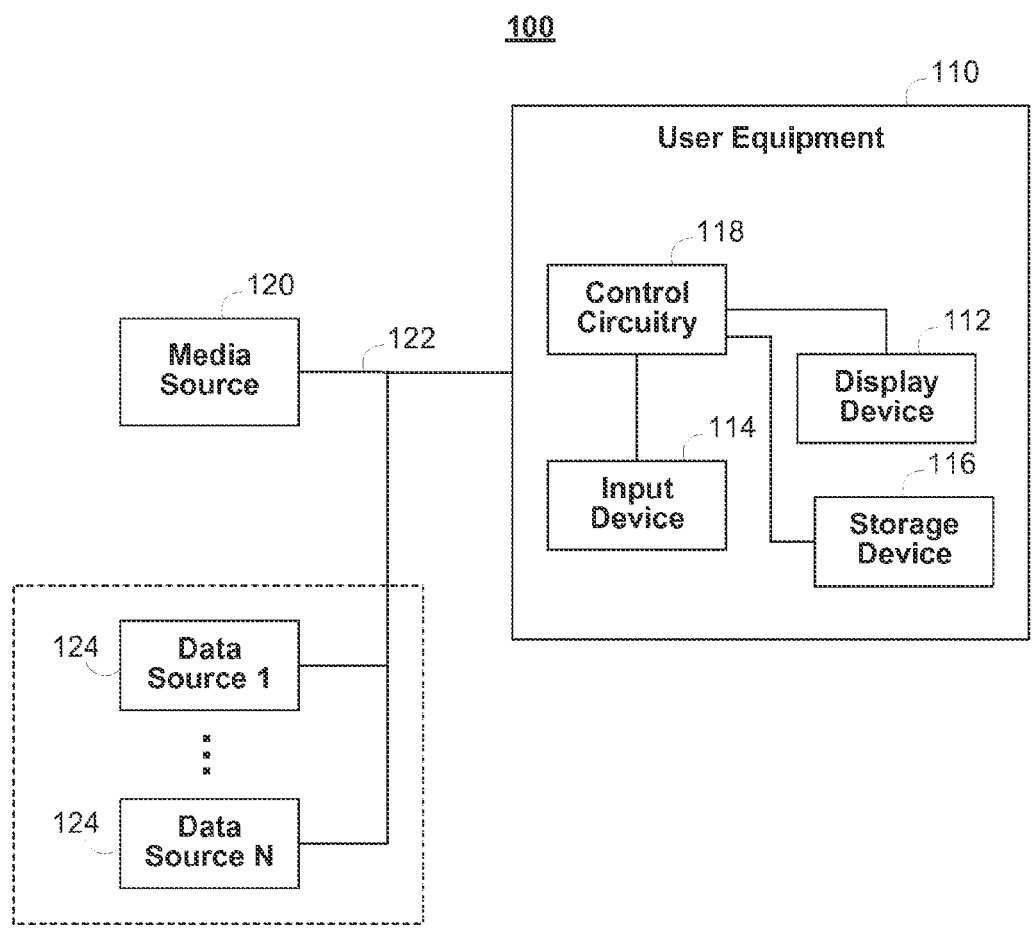
FIG. 1 is a diagram of an illustrative interactive television system in accordance with an embodiment of the present invention.

FIG. 1 shows illustrative interactive media system 100 in accordance with an embodiment of the invention. User equipment 110 receives content in the form of signals from media source 120 over communications path 122. In practice there may be multiple media sources 120 and user equipment 110, but only one of each has been shown in FIG. 1 to avoid over-complicating the drawing.

Media source 120 may be any suitable media source such as, for example, a cable system headend, satellite media distribution facility, media broadcast facility, on-demand server (e.g., VOD server), game service provider (e.g., for online gaming), Internet service provider (e.g., for providing Websites), an ordered list provider (e.g., for providing playlists), an asset provider (e.g., for providing assets or asset characteristics) or any other suitable facility or system for originating or distributing content. Media source 120 may be configured to transmit signals over any suitable communications path 122 including, for example, a satellite path, a fiber-optic path, a cable path, an Internet path, or any other suitable wired or wireless path. The signals may carry any suitable content such as, for example, television programs, games, music, news, and/or web services. In some embodiments, media source 120 may include control circuitry for executing the instructions of an interactive media guidance application such as, for example, a client/server or online interactive media guidance application.

As defined herein, an asset refers to any type of media that may be played, accessed, recorded or viewed. Such media may include all the variants of television media, music media, interactive games, and other audio and/or video media. Each asset may be associated with an identifier that identifies an aspect (e.g., name or title) of the asset. For example, the title of the movie "GoldenEye" may be associated with a video-on-demand asset or a recorded asset, and the title of the song "1979" by the Smashing Pumpkins may be associated with a music asset or game featuring the song's concept. Each asset includes asset characteristics that identify content present in the asset. Asset characteristics may include, for example, information conveying the amount of violence in the asset, amount of sexual content in the asset, genre type of the asset, parental control information pertaining to the asset, etc.

Media source 120 may store user preference profiles according to the invention which may be accessed by user equipment 110. For example, when a user sets up a user preference profile that contains preference characteristics relating to an asset, that user preference profile may be maintained at media source 120. Maintaining the user preference profile at media source 120 may be advantageous because media source 120 can dynamically adjust the contents or preferences of the user preference profile based on the user's local or remote viewing behavior. Maintaining the user preference profile at media source 120 may also be advantageous because it may be accessed by users and family members at a different user equipment 110. Alternatively, user preference profiles may be stored on user equipment 110.

User equipment 110 may include any equipment suitable for providing an interactive media experience. User equipment 110 may include television equipment such as a television, set-top box, recording device (e.g., digital video recorder), video player, user input device (e.g., remote control, keyboard, mouse, touch pad, touch screen and voice recognition interface), or any other device suitable for providing an interactive media experience. For example, user equipment 110 may include a DCT 2000, 2500, 5100, 6208 or 6412 set-top box provided by Motorola, Inc. In some embodiments, user equipment 110 may include computer equipment, such as a personal computer with a television card (PCTV) or an Open Cable Unidirectional Receiver (OCUR) plug-in card and optionally a security access card suitable for secure delivery of content. In some embodiments, user equipment 110 may include a gaming system, a portable electronic device, such as a portable DVD player, a portable gaming device, a cellular telephone, a PDA, a music player (e.g., MP3 player), or any other suitable portable or fixed device.

User equipment 110 may include a network interface (not shown) that interconnects various elements of user equipment 110 within, for example, a household. Such an arrangement may permit interconnection of multiple instances of user equipment 110 and/or use of a remotely located recording device (e.g., digital video recorder) or user equipment 110 which may store recorded programs or user profiles that may form a basis for ranking assets relative to a group of viewers.

In the example of FIG. 1, user equipment 110 includes at least control circuitry 118, display device 112, and user input device 114, which may be implemented as separate devices or as a single device. An interactive media guidance application, such as an interactive television program guide, may be implemented on user equipment 110 to control the display, on display device 112, of the media transmitted by media source 120 over path 122 and to provide interactive media guidance application features.

The media that may be played by user equipment 110 may vary widely. In fact, many different types of media may be played by user equipment 110. Many different types of media may be available because each media type may be unique in a technical sense (e.g., a particular technical implementation is required to play a particular type of media) or is considered unique in a definitional sense (e.g., a video-on-demand program may be considered a different type of media than a broadcast program). The different types of media may be classified generally or to a desired degree of specificity. For example, media may be classified into various types, including television media, music media, and audio and/or video media. Within each general media type, more specific and different media types are available. Television media may include, for example, broadcast television programming, recorded television programming, video-on-demand (VOD) programming, near video-on-demand (NVOD) programming, pay-per-view programming, satellite television programming, and streaming video programming. Recorded television programming may be a recording of another type of television programming (e.g., linear programming). Recorded television programs or assets may be stored locally on user equipment 110 or remotely on networked user equipment (not shown). Recorded television programming or assets may also be stored on a remote network video recorder/server (such as media source 120 or similar remote server). Music media may include, for example, MP3 files, WAV files, MIDI files, AAC, Real media, Dolby Digital, or other suitable format with which music can be compressed, distributed and stored on user device 110.

Display device 112 may be any suitable device such as, for example, a television monitor, a computer monitor, or a display incorporated in user equipment 110 (e.g., a cellular telephone or music player display). Display device 112 may also be configured to provide for the output of audio. Display device 112 may be configured to present a display representing a plurality of individual preference values and a group preference value relative to a particular asset. An indicator may be provided on display device 112 indicating both the plurality of individual preference values and the group preference value relative to a particular asset.

Control circuitry 118 is adapted to receive user inputs from input device 114 and execute the instructions of the interactive media guidance application. Control circuitry 118 may include one or more tuners (e.g., analog or digital tuners), encoders and decoders, processors (e.g., Motorola 68000 family processors), memory (i.e., RAM and hard disks), communications circuitry (e.g., cable modem circuitry), input/output circuitry (e.g., graphics circuitry), connections to the various devices of user equipment 110, and any other suitable component for providing analog or digital media programming, program recording and playback, and interactive media guidance features. In some embodiments, control circuitry 118 may be included as part of one of the devices of user equipment 110 such as, for example, part of display 112 or any other device (e.g., a set-top box, television and video player).

Control circuitry 118 may receive various individual preference values from, for example, various user profiles and compute a plurality of individual preference values relative to an asset. Each individual preference value is associated with a different viewer of a plurality of viewers. One way control circuitry 118 may compute the individual preference values is based on Euclidean distance. An illustrative Euclidean distance-based approach is described in U.S. patent application Ser. No. 11/324,147, filed Dec. 29, 2005, incorporated by reference herein in its entirety.

Control circuitry 118 may compute a group preference value relative to the asset as a function of the plurality of individual preference values. The function may be a sum of the individual preference values. For example, if a one viewer's preference relative to a particular asset is computed to be 12 (based on the viewer's preference profile) and another viewer's preference relative to a particular asset is computed to be 2, then control circuitry 118 may compute the group preference value for the particular asset to be (i.e., the sum of each individual preference value 12 and 2).

For example, the computation of individual and group preference values may be based on two viewer profiles which have the following preferences. Jack may be a viewer in a group with a preference for Sex equal to 7.8 and for Violence equal to 3. Jill may be a viewer in the same group as Jack and may have a preference for Sex equal to 4 and for Violence equal to 9. Control circuitry 118 may retrieve a particular asset (e.g., Family Guy) and the corresponding asset characteristics. For example, the asset characteristics of Family Guy may be Sex with a value of 6 and Violence with a value of 7.

Control circuitry 118 may compute each of the individual preference values and the group preference value for each viewer in the group using for example a Euclidean-based approach. In particular, for the viewer Jack, control circuitry may compute the Euclidean distance to be the square root of sum of the squares of the differences of Jack's preference values relative to the asset's characteristic values. Accordingly, Jack's individual preference value may be equal to $\sqrt{((7.8-6)^2+(3-7)^2)}=4.38$ and Jill's individual preference value may be equal to $\sqrt{((4-6)^2+(9-7)^2)}=2.82$. A lower individual preference value indicates that a user's preferences are closer to the characteristics of the asset under consideration and thus may represent a stronger match or greater relevance to the asset. Thus, it is apparent that the particular asset, Family Guy, is more relevant to Jill than it is to Jack based on the individual preference values. Additionally, as discussed above and below, the group preference value may be computed by computing the sums of the individual preference values which in this example would be equal to 7.2. In this example, the smaller the group preference value, the higher the group preference. A group preference value may be similarly computed for other assets. Control circuitry 118 may display the group preference values side-by-side (in the form of, for example, a bar line) with an appropriate asset designator (e.g., an asset title) allowing the viewers to determine which asset is most relevant to the group.

In some implementations, control circuitry 118 may perform an inverse computation on the individual preference value in order to make a larger value of the individual preference value represent a stronger match or greater relevance to the asset. Thus, when a user compares the individual preference values to the group preference value it becomes more intuitive to the user to view larger values as representing greater relevance. In particular, referring back to the above example, Jack's individual preference value may be 0.228 and Jill's individual preference value may be 0.354 while the group's preference value may be 0.582.

It should be understood that other types of functions may be performed on the individual preference values to compute a group preference value, such as, for example, finding a Euclidean distance between various individual preference values, determining a multidimensional group centroid or middleground based on the individual preference values and their location in preference space, a difference function, a logarithmic function, an averaging function, or any other suitable mathematical computation. Computing group preference values will be described in more detail in connection with FIGS. 7-9. Similarly, various scaling functions may be performed on the group preference values (and correspondingly the individual preference values) to better represent the group preference values to a user. For example, all group preference values may be logarithmically scaled to compress the dynamic range of the results into a more pleasing presentation to the user.

User equipment 110 may include a storage device 116 such as, for example, memory or hard-drive (e.g., digital video recorder). Only one such storage device is shown to avoid overcrowding the figure, though it should be understood that additional storage devices may be used as desired. Storage device 116 may store data (e.g., playlists) and media (e.g., recorded assets). In another embodiment (not shown) user equipment 110 may be able to access a storage device located at a remote site and store data and/or media at that remote storage device. Such a remote storage device may be referred to herein as a networked storage device or a networked digital video recorder.

In some embodiments, the interactive media guidance application may provide features to the user with a client/server approach. For example, data pertaining to preference profiles or user preferences may be provided to the server, which may store the data from the client. When the client generates a group or individual preference value, it may retrieve the user preference profiles from the server, or alternatively, the client may order the elements (i.e., individual preferences pertaining to an asset) of a user preference profile retrieved from the server. There may be one server for each instance of user equipment 110, one for multiple instances of user equipment 110, or a single server may serve as a proxy for each instance of user equipment 110.

Any suitable number of users may have equipment, such as user equipment 110, connected to media source 120 and data source 124. But for clarity of illustration, the equipment of only a single user is shown. The equipment of the plurality of users may be connected to media source 120 and data source 124 using a cable television network, a local area network (LAN), a wireless network, or any other suitable means. In some embodiments, multiple instances of user equipment 110 may be connected or networked to each other using any suitable means (e.g., within a household using a LAN, potentially using the Multimedia Over Coax (MoCA) standard or between households using a WAN over DOCSIS network).

User equipment 110 may receive interactive media guidance application data from one or more data sources 124. Data sources 124 may provide data for a particular type of content or for a particular application. For example, one data source 124 may provide data for non-on-demand assets (e.g., non-pay and pay-per-view programs), and another may provide data for on-demand assets (e.g., VOD programs). Or, for example, a single data source may provide both of these types of data. For example, one data source 124 may provide data for an interactive television program guide. Another data source 124 may provide data for asset characteristics used in computing individual and group preference values relative to the asset. Another data source 124 may, for example, provide data for another interactive application (e.g., a home shopping application). In some embodiments, data sources 124 may provide data to the interactive media guidance application using a client/server approach. There may be one server per data source, one for all sources or, in some embodiments, a single server may communicate as a proxy between user equipment 110 and various data sources 124. In some embodiments, data sources 124 may provide data as an online interactive media guidance application. In such embodiments, data source 124 may include control circuitry for executing the instructions of the online media guidance application.

FIG. 1 shows media source 120 and data sources 124 as separate elements. In practice, their functionality may be combined and provided from a single system at a single facility, or multiple systems at multiple facilities. For example, one media source 120 and data source 124 may be combined to provide VOD content and associated VOD data.

For the purposes of clarity, the following discussion may sometimes describe an embodiment in which the interactive media guidance application is an interactive program guide. It will be understood, however, that the following discussion and the features discussed may be applied to any interactive media guidance application including online or Internet based media guidance applications.

Figure 2:
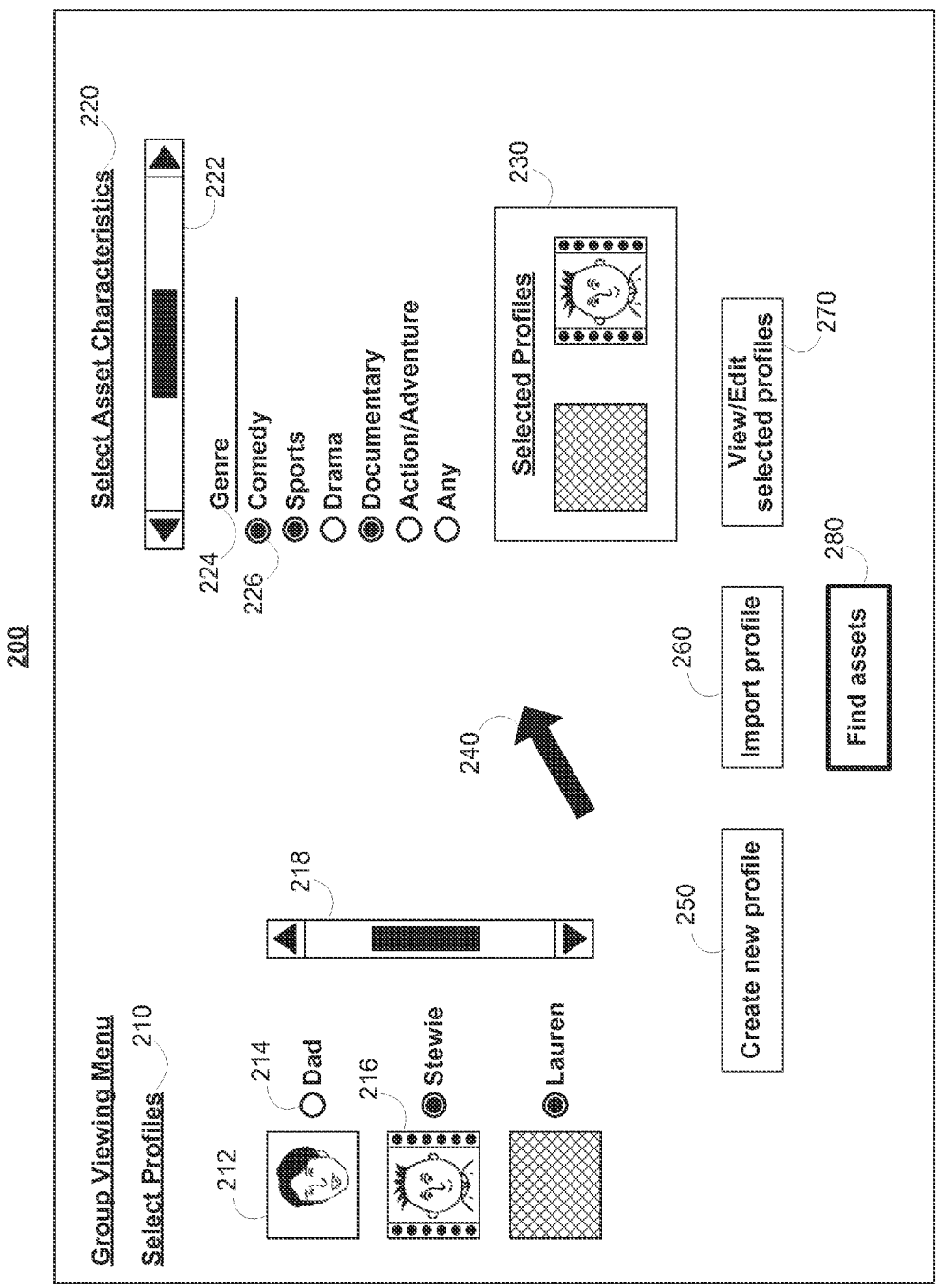
FIG. 2 shows an illustrative group viewer selection screen for computing a group preference value in accordance with an embodiment of the present invention.

FIG. 2 shows an illustrative group viewer selection screen 200 for computing a group preference value in accordance with an embodiment of the present invention. Group viewer selection screen 200 includes profile selection 210, asset characteristics selection 220, new profile option 250, profile import option 260, profile edit option 270 and search assets option 280.

Group viewer selection screen 200 allows a user to select a group of users who wish to jointly view assets. For example, a user may define which members of a family wish to watch a television program together on a given night. The system may retrieve each of the selected user's preferences and apply them to a various assets to find or rank the assets according to their relevance to the selected group.

In some embodiments, the system may display the highest ranked or most relevant assets to the group. The display may include indicators that allow each viewer to determine the particular asset's relevance to the viewer relative to the rest of the group. In this way, the invention helps a group choose assets that best match the user preferences of each viewer in the group.

The Select Profiles section of the display 210 may include a list of viewers for which preferences have been defined. In some embodiments, the preferences are defined for different viewers and stored in preference profiles. Each preference profile is unique to a particular viewer and has preferences associated with asset characteristics for that viewer. Preference profiles and their creation will be discussed in more detail below in connection with FIG. 3.

An icon 212 or 216 may be displayed to identify a particular viewer for which the system has preferences defined. Icon 212 may be an image 212, a movie 216, a clip, an animation, a drawing, or any other identifier unique to a particular viewer. For example, a viewer, for example, Stewie, for which the system has preferences defined may be identified using a previously selected icon such as a clip from the show Family Guy. Accordingly, a user may identify the members of a group by referring to their respective icons and disregarding their name.

A radio button 214 may be provided to add a particular viewer to the group of viewers. A cursor 240 may be used to select radio button 214 that corresponds to a viewer which is to be added to the group or a user may use arrow keys and an OK button or any appropriate means to highlight and select appropriate options from the screen (e.g., by way of a touch screen or a remote control). For example, as shown in group viewer selection screen 200 the members or viewers selected for the group are Stewie and Lauren as evidenced by the filled radio button 214.

A scroll bar 218 may be provided to show additional viewers which have preferences defined in the system. For example, if the screen 200 has space that limits the number of viewable viewer selections to three at a time (as shown in the illustrative screen), the user may scroll down or up to show other viewers which have preferences defined. In some embodiments, the viewer selection may be provided in a separate screen to allow more viewers and their respective icons to be shown. For example, the viewer icons may be displayed in a matrix or list fashion allowing simple selection of multiple viewers to add to a group. This may make it unnecessary to provide scroll bar 218 as all or most potential viewers can be selected in one screen.

The viewers or profiles which are selected to be part of the group for which assets will be ranked may be shown in a portion of the screen identified as selected profiles 230. For example, when the profiles for viewers Stewie and Lauren are selected, their respective icons 212 may be displayed in selected profiles 230 portion of the screen. Profiles or their icons which appear in selected profiles 230 portion of the screen may be selected using cursor 240 to delete or remove them from the group in case a user changes his or her mind about which members should belong to the group. Additionally, profiles or their icons which appear in selected profiles 230 portion of the screen may be selected using cursor 240 and moved around to change the order in which they appear.

In some embodiments, changing the order in which profiles appear in selected profiles 230 portion of the screen may also affect the priority that is assigned to the particular profile. Priority of a user profile may be used in the ranking computation to place one user's preferences ahead of another. For example, if one user has a low preference for violence but another user with a higher priority has a high preference for violence, the system may nevertheless rank an asset with high violence characteristic as being relevant to the group because of the user's high priority designation. Whereas, if both users have the same priority designation the system may rank an asset with high violence as having little or no relevance because the two user preferences for violence are in conflict. Priority designations will be described in more detail below in connection with FIG. 3.

Group viewer selection screen 200 also includes asset characteristic selection 220. In order to search for assets with more focus, a user may define one or more characteristics which must be present in the asset for it to be relevant. For example, the selected group may desire to only access assets that are Comedies or Documentaries, all other assets being irrelevant. Accordingly, the user may use scroll bar 222 to find the Genre asset characteristic in order for the Genre options to appear. Once Genre 224 is found (using scroll bar 222), a list of asset characteristics options may be presented. Each asset characteristics option may have an associated radio button 226 to allow a user to select or deselect the option as a must have asset characteristic.

For example, when the user selects the radio button 226 associated with Comedy, Sports or Documentary, only those assets which belong to one of those Genres will be searched for and ranked as relevant to the group of viewers. Within each of those assets having the selected asset characteristics, there are other asset characteristics, such as, violence and sex, that may be compared with the selected group of viewer's preferences in order to rank their relevance to the group. An option to have assets that belong to any Genre asset characteristic searched for may also be provided.

In some embodiments, the system may perform a preliminary search through the selected group preference profiles to determine whether a selected asset characteristic 220 will provide any matches. If no matches are found, the system may display a warning to the user in the form of a pop-up window indicating that no matches will be found. For example, if all of the preference profiles in the selected group include a low preference for a Drama Genre and the user selects Drama as a must have asset characteristic, the system may determine that the assets will be relevant to none of the viewers in the selected group and provide a warning to the user before the search for assets option 280 is selected.

A new user profile creation option 250 may also be provided to add a new user profile to the system. Upon creating a new profile, the newly created profile will be selectable as one of the profiles listed in profile selection 210. The newly created profile may then be added to the group of viewers for which assets are ranked by the system. Selection of the new profile creation option 250 may navigate the user to a new screen like the one shown in FIG. 3. Creation of a new profile will be discussed in more detail below in connection with FIG. 3.

An import profile option 260 may also be provided to add a new profile to the system from a remote source. Upon importing a new profile, the imported profile will be selectable as one of the profiles listed in profile selection 210. The imported profile may then be added to the group of viewers for which assets are ranked by the system. Selection of the import profile option 260 may navigate the user to a new screen like the one shown in FIG. 4. Importing a profile will be discussed in more detail below in connection with FIG. 4.

Users may choose to import profiles using option 260 when they want to add viewers to a group who either are not members of the household (e.g., visiting guests) or that have not previously used the local user equipment (e.g., new members of the household). For example, a family having each of its members' preferences stored in profiles on the system may invite a friend to access an asset. The friend might not have a profile stored on the family's system but may actually have a profile online or at some other remote source. Accordingly, instead of recreating the friend's profile on the family's system, the import profile option 260 may be selected and the remote location storing the friend's profile may be accessed to retrieve the friend's preferences. A search for assets that match this group (i.e., the family and the invited friend) may then be performed to rank assets relevant to this group. In some embodiments, groups of individuals' profiles can be stored for future retrieval, along with any group concessions (e.g., a group may carry a group override or concession on one member's hard limit against viewing any programs with ratings greater than PG-13).

A view/edit selected profiles option 270 may be provided to modify preferences stored in the preference profiles. Selection of the view/edit selected profiles option 270 may bring up a screen similar to the one shown in FIG. 3 allowing one or more viewers to view or modify preferences which are stored in their respective profiles. If a selected profile is one that is imported from a remote source, the imported profile may also be viewed or modified and the modifications may be stored to the locally stored profile, the profile stored on the remote source or both. In some embodiments, local and remote profiles may be searched for inclusion in a group. For example, in large families or communal living situations, the system may be used to provide recommendations of groups of individuals that would likely enjoy watching programs together and optionally suggest content. In particular, the system may search multiple preference profiles that are associated with viewers in the system to identify two or more profiles that have two or more asset characteristic values that are within a similarity threshold of each other (e.g., based on their individual preference values). The system may provide a recommendation to form a group of viewers that are associated with the identified profiles. Other such options, such as consolidating profiles across systems and maintaining different profiles for different contexts and other profile update/modification techniques should also be considered within the scope of the present invention as would be understood by one skilled in the art.

Figure 7:
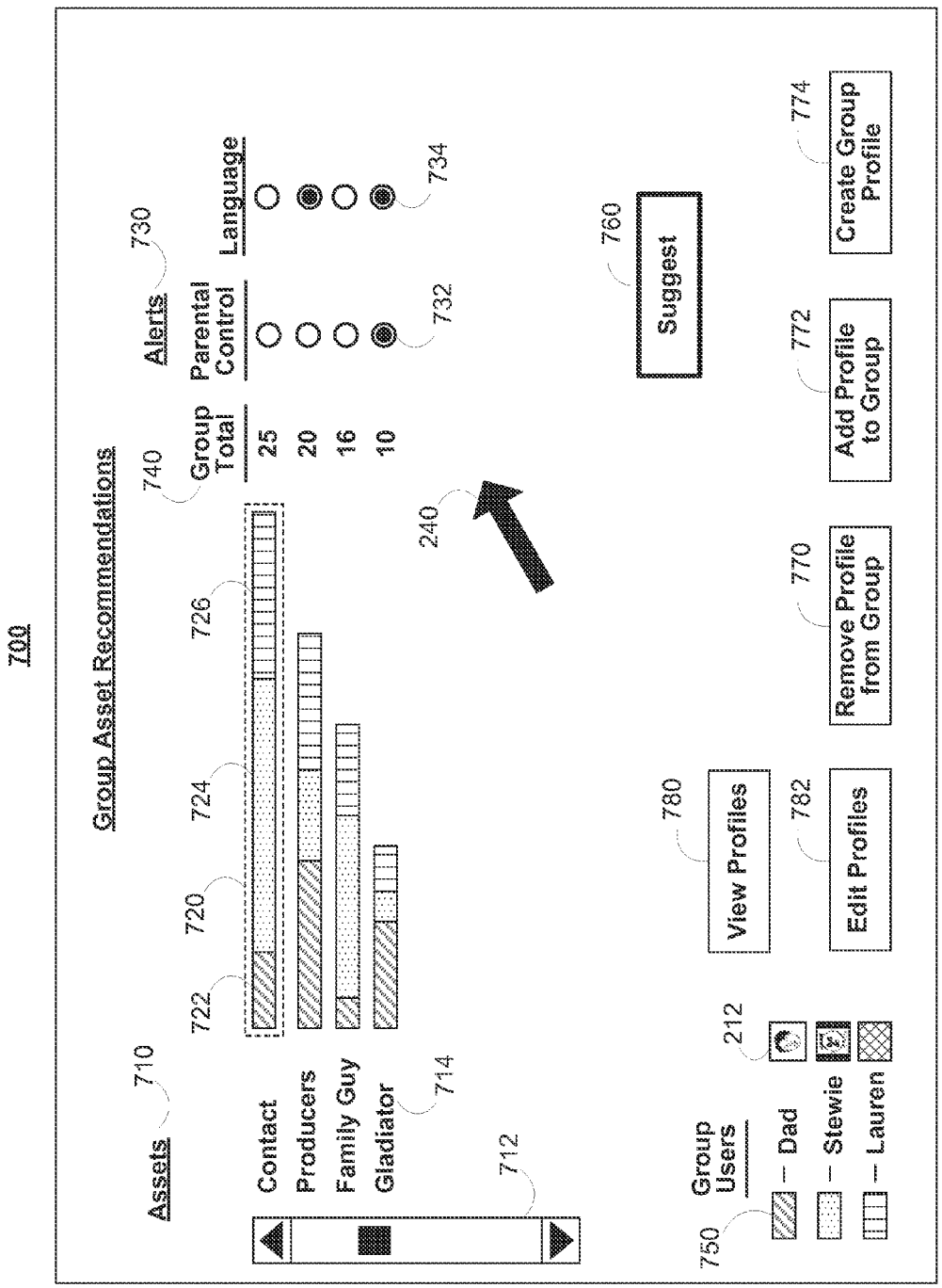
FIGS. 7-9 show illustrative displays representing individual preference values and a group preference value for an asset in accordance with embodiments of the present invention.
Figure 8:
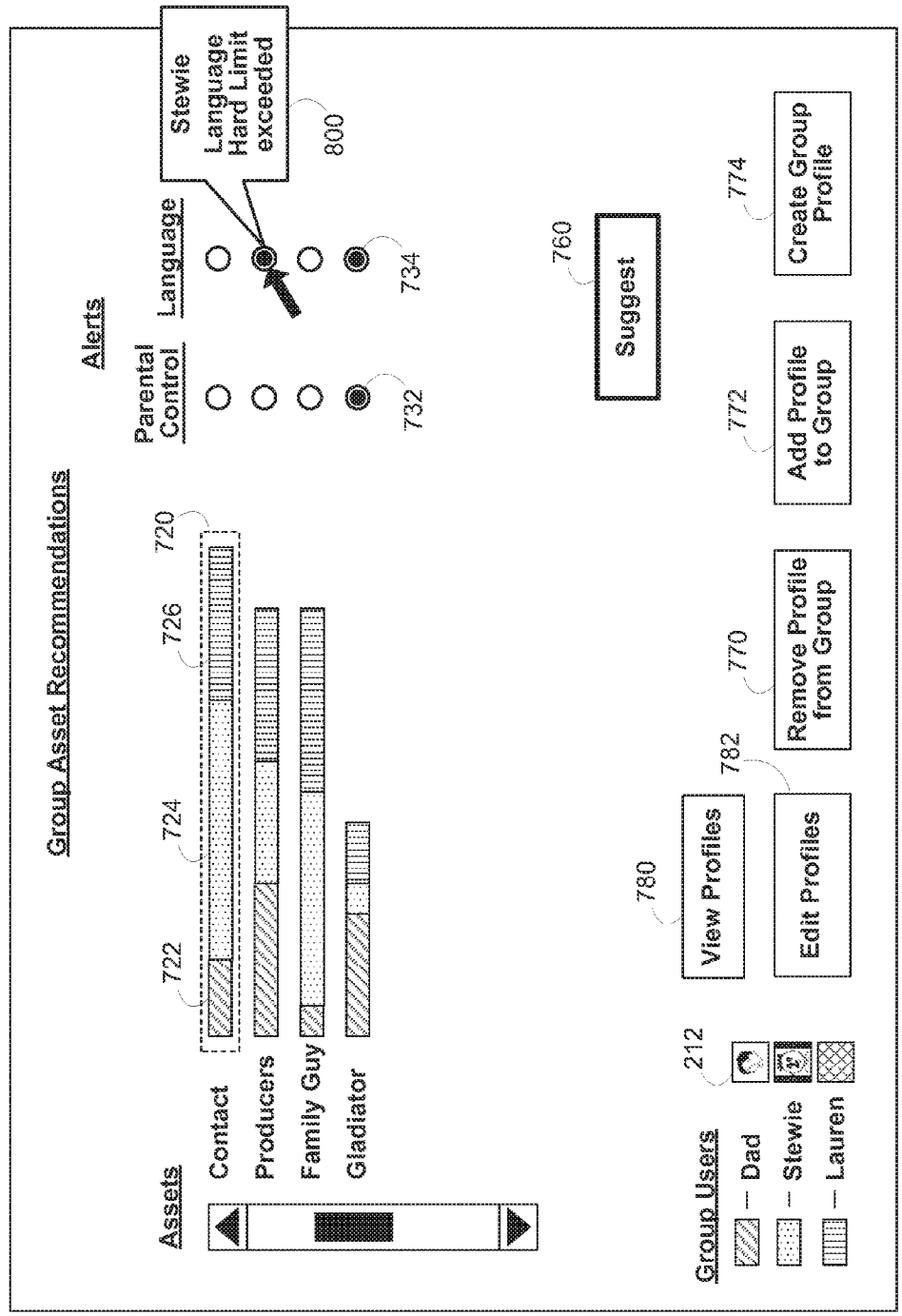
Figure 9:
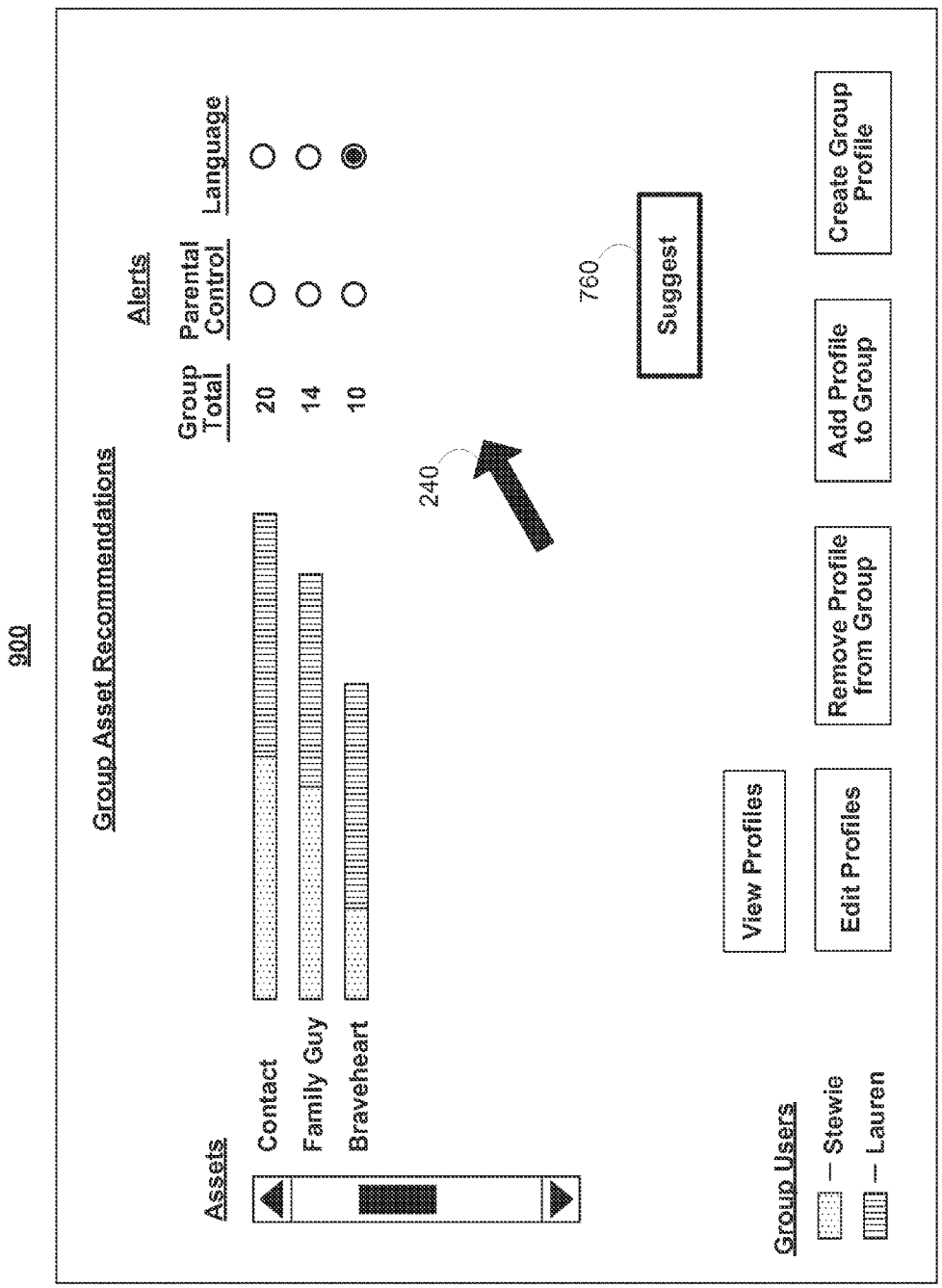

After the group has been defined and all the profiles that belong to the group are selected, the user may instruct the system to search and rank assets that match the group preferences. Selection of the search for assets option 280 instructs the system to perform the computations and display the results. An exemplary display of the ranked results is shown in FIGS. 7-9. The display may include indicators that simultaneously indicate to the viewers in the group each individual viewer's level of interest (i.e., preference value) in each asset as well as the group's overall level of interest (i.e., preference value) in each asset. The display of the results will be discussed in more detail below in connection with FIGS. 7-9.

A user may store their preferences relative to asset characteristics in a preference profile. In some embodiments, the user may be presented with an equalizer that allows the user to adjust various preferences depending on what the user likes/dislikes. The preferences are then stored in a preference profile and used to compute the user's preference value for a particular asset.

Figure 3:
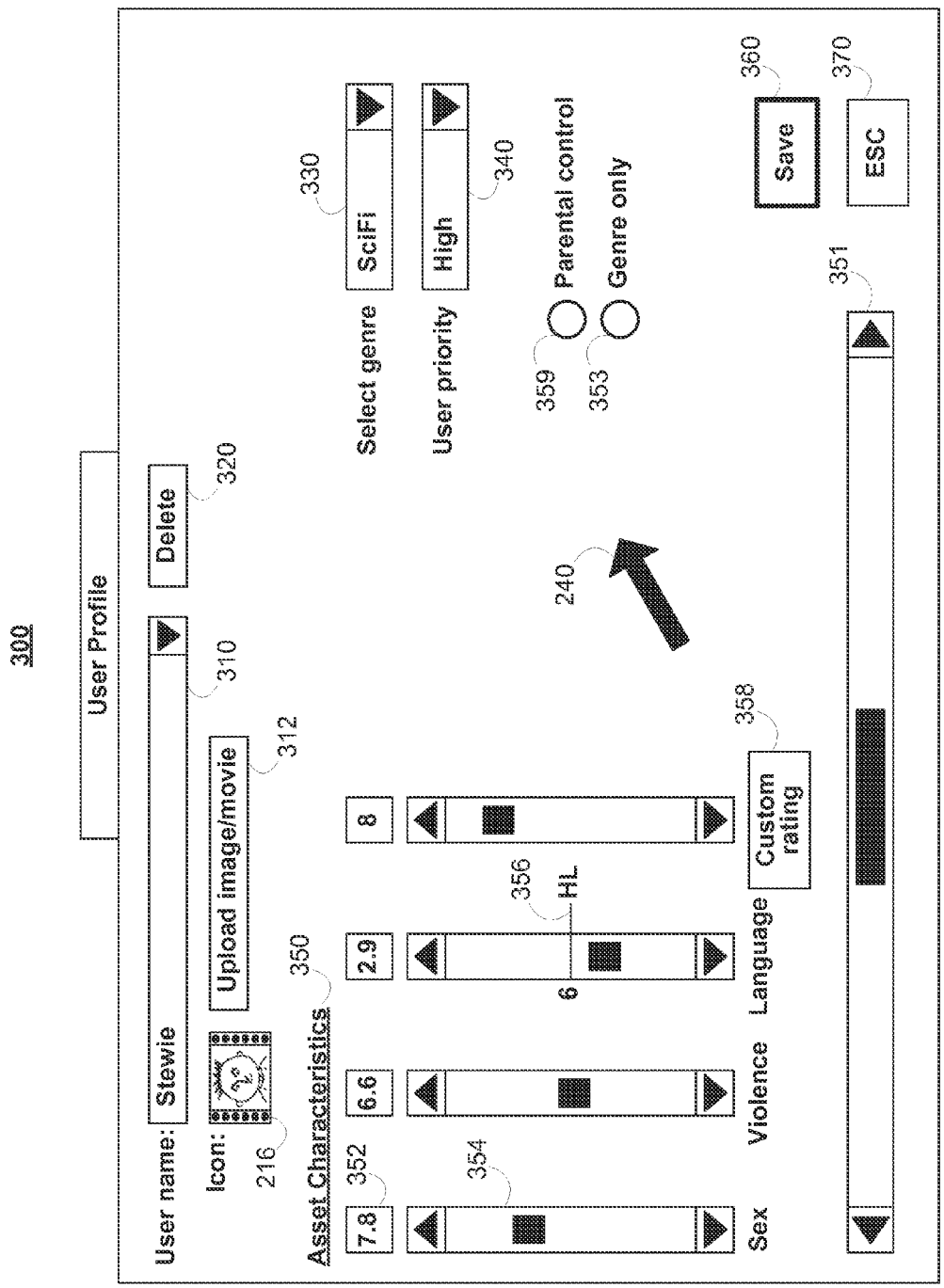
FIG. 3 shows an illustrative user preference equalizer for storing user preferences in accordance with an embodiment of the present invention.

FIG. 3 shows an illustrative user preference equalizer 300 for storing user preferences in a preference profile in accordance with an embodiment of the present invention. Preference equalizer 300 includes a user name field 310, icon 216, asset characteristics preferences 350, user priority designation field 340, a save option 360 and an escape option 370.

The name that appears in user name field 310 is the name of the user with which the particular preferences are associated. The drop down selector for name field 310 may include all the names of the profiles selected in profile selection 210 (FIG. 2). A user may select the drop-down option to view or select an equalizer or preferences for a different viewer. Upon importing a preference profile, that imported profile may also be included as an option to view in the name field 310. A profile that is imported may be shown with an indicator informing a user that the profile has been received from a remote source. Thus, when modifications are made the user may choose to either save those modifications only locally, remotely or to both locations.

Icon 216 may be associated with the particular viewer for which the preferences are shown and may be displayed. A user may change the icon that is associated with the viewer by selected the upload image/movie option 312. Selection of this option may either present to the user a variety of other icons which the user may select as their unique identifier or may request the user to specify a path from which to upload the icon information. The icon information may be uploaded from an external source such as the Internet, a Bluetooth device, a Blackberry source, an external computer, a video game controller (e.g., the Wii controller) or any other device that can provide image, video, or animation information.

A preference profile that is no longer necessary or should be removed from a group may be deleted using delete option 320. Selection of delete option 320 removes the viewer from the group and optionally deletes all of that viewer's preferences from the system. If the viewer's profile was received from a remote source the system may ask the user whether the profile should be deleted only locally, from the remote source or both.

The asset characteristics preferences 350 displayed in equalizer 300 may correspond to a particular Genre selected in Genre field 330 if the optional genre only radio button 353 is selected under a particular equalizer, otherwise, the equalizer setting will be applied broadly across all genres. In particular, the user may define different asset characteristics preferences 350 depending on the type of Genre. For example, the user may have a high tolerance for violence if the Genre is SciFi but may specify a lower tolerance for a Genre of Comedy. Accordingly, when the system computes the individual's preference value for a particular asset, the system determines the genre of the asset and retrieves the user's preferences from the preference profile relating to the asset's genre.

Each scroll bar 354 in asset characteristics preferences 350 corresponds to a different asset characteristic. The user may adjust each asset preference characteristic by raising or lowering the scroll bar values which are represented in preference characteristic value field 352. In some aspects of the invention, a higher preference characteristic value represents a higher tolerance for that asset's characteristic. In other aspects of the invention, a lower preference characteristic value represents a higher tolerance for that asset's characteristic.

The user may scroll left or right using scroll bar 351 to view other asset characteristics preferences 350 which are not in the display. In particular, due to screen size constraints, some asset characteristics preferences may be displayed while others are hidden. Scrolling left or right may reveal the hidden asset characteristics preferences.

Within each asset characteristics preference 350 the user may also set hard limits 356. For example, as shown in equalizer 300, the user has set a hard limit value equal to six for the language asset characteristics preference. The hard limit designation informs the system that where a particular asset's characteristic exceeds the corresponding preference characteristic hard limit value, that asset should either be flagged or removed from ranking. For example, although the particular viewer's asset characteristics preference value for language is set at the value 2.9, an asset having a corresponding language characteristic of 4 may still appear in the ranking but may be ranked lower for this particular viewer. Thus, the asset may still appear in a group ranking (although ranked low) for a group containing that viewer even though it has a characteristic value which exceeds the viewer's characteristic value. However, if the asset would have a characteristic value which exceeds the viewer's hard limit value for that asset the system may not present the asset in an associated group ranking at all. Alternatively, the system may nevertheless present the asset but may indicate that a hard limit value was exceeded using an indicator. Alerts such as these indicators which inform the users that a hard limit value was exceeded will be described in more detail below in connection with FIGS. 7-9.

Similarly, the user may select a parental control option 359 to inform the system that when an asset has a parent control characteristic present, then the asset should either be excluded from the rankings or flagged as exceeding a particular viewer's preference characteristics. The decision to either exclude from the rankings or provide an alert may be made by determining the viewer's priority designation set in field 340. For example, if the user has a high priority level then the system may exclude from ranking the asset having characteristics which exceed a hard limit value or which have a parental control setting enabled. This is because the system determines that it is more important to satisfy the particular viewer's interests having a high ranking than another viewer which has a lower ranking. Alternatively, if the viewer has a low priority designation and an asset has a characteristic which exceeds a hard limit value of the viewer, then the system may nevertheless rank the asset but may present an indictor in the form of an alert to inform the users that a hard limit value was exceeded.

A user may also define a custom asset characteristics preference rating as indicated by custom rating indicator 358. For example, if the system does not have an asset characteristics preference equalizer previously defined for a particular asset characteristic but a particular asset characteristic is present in one or more assets, the user may create an asset characteristics preference equalizer and provide values for that preference. The system may perform computations using the custom defined asset characteristics preference value.

Each of the values defined in the asset characteristics preferences 350 may be stored in a vector form. The system may perform vector computations to compute individual and group preference values for various assets.

The user may also select escape option 370 to return to a previous screen. For example, selecting escape option 370 may return the user to the group viewing menu screen 200 (FIG. 2) to allow the user to add or remove users from a group. From group viewing menu screen 200 the user may instruct the system to rank assets relative to the selected group based on the modifications made to the various viewer preference profiles in equalizer screen 300.

After the user has finished adjusting the various settings for the selected viewer 310, the user may select the save option 360 to store the asset preference characteristics to a memory. For example, after selecting save option 360 the system may either create or modify a preference profile data structure that includes the various viewer preference characteristics. An exemplary preference profile data structure 500 is shown in FIG. 5.

In some embodiments, control circuitry 118 may automatically create or adjust settings for one or more preference profiles. For example, a viewer may select his or her profile at the start of a viewing experience. Control circuitry 118 may monitor the viewing experience for a predetermined time (e.g., until the viewer turns off the monitoring) and, based on what the viewer does, adjust preference settings in the viewer's profile automatically based on assets viewed.

Preference profile data structure 500 may have fields that correspond to the various settings and adjustments that can be made in equalizer 300. In particular, preference profile data structure 500 may include a name field 510, an icon field 520, a genre field 530, an asset preference characteristic field 532 and a hard limit field 534. Each of the fields may store the value that corresponds to the user modified preference. In some embodiments, it may be easier for advanced users to manually enter or modify values in preference profile data structure 500 instead of loading equalizer 300. The system retrieves preference profile data structure 500 for each selected viewer in the group and computes a preference value for a particular asset for each of the viewers depending on the values present in the preference profile data structure 500.

For example, the system may retrieve an asset characteristics data structure from memory, which may be local in user equipment device 110 or remote in media source 120, and compare the values stored in the asset characteristics data structure with those of the preference profile data structure 500, which may be local in user equipment device 110 or remote in media source 120, that corresponds to each viewer in the group.

FIG. 6 shows an illustrative asset characteristics data structure 600 in accordance with an embodiment of the present invention. Asset characteristics data structure 600 may include fields that define characteristics of the particular asset. Asset characteristics data structure 600 may include a title field 610, a duration field 620, a genre field 640, and a sex value field 630.

The system retrieves asset characteristics data structure 600 and compares the values stored in each field with the corresponding preference characteristics stored in each viewer's preference profile data structure. In some implementations, the control circuitry 118 (FIG. 1) may perform a sum of each characteristic stored in asset characteristics data structure 600 with the corresponding preference characteristic stored in each viewer's preference data structure. In some other implementations, the control circuitry 118 may compute a Euclidean distance between the location of each program's characteristics relative to the location of a viewer's corresponding characteristics preference value in an n-dimensional space where the value for n is the number of characteristics which are being computed. The control circuitry 118 may then compute the vector sum for each individual and thereby arrive at the individual's preference value for that asset. In such implementations, the higher the individual's preference value for an asset, the greater relevance the asset has to that user.

The control circuitry 118 may then perform a function on all of the viewer's individual preference values to compute a preference value for the group. In some implementations, the function the control circuitry 118 performs is a sum of all of the individual preference values to arrive at a group preference value. In some other implementations, a multidimensional group centroid or group middleground is computed for the viewers in the group based on their individual preference values and its location in preference space. The Euclidean distance from this point to a program is then computed to determine a rank for the particular asset.

The control circuitry 118 compares and computes the individual and group preference values for each asset in the selected genres. The control circuitry 118 may sort the assets according to their relevance to the group of viewers and may identify to the viewers the asset having the greatest relevance relative to the ones with the least relevance. One way the control circuitry 118 identifies the relevance of the assets to the group may be by displaying the assets in order of relevance where the asset most relevant to the group is displayed first and the remaining assets are listed below the most relevant asset in order of decreased relevance to the group. The control circuitry 118 may alternatively represent the most relevant assets with a brighter color identifier and use darker colors for assets have less relevance to the group.

Figure 4:
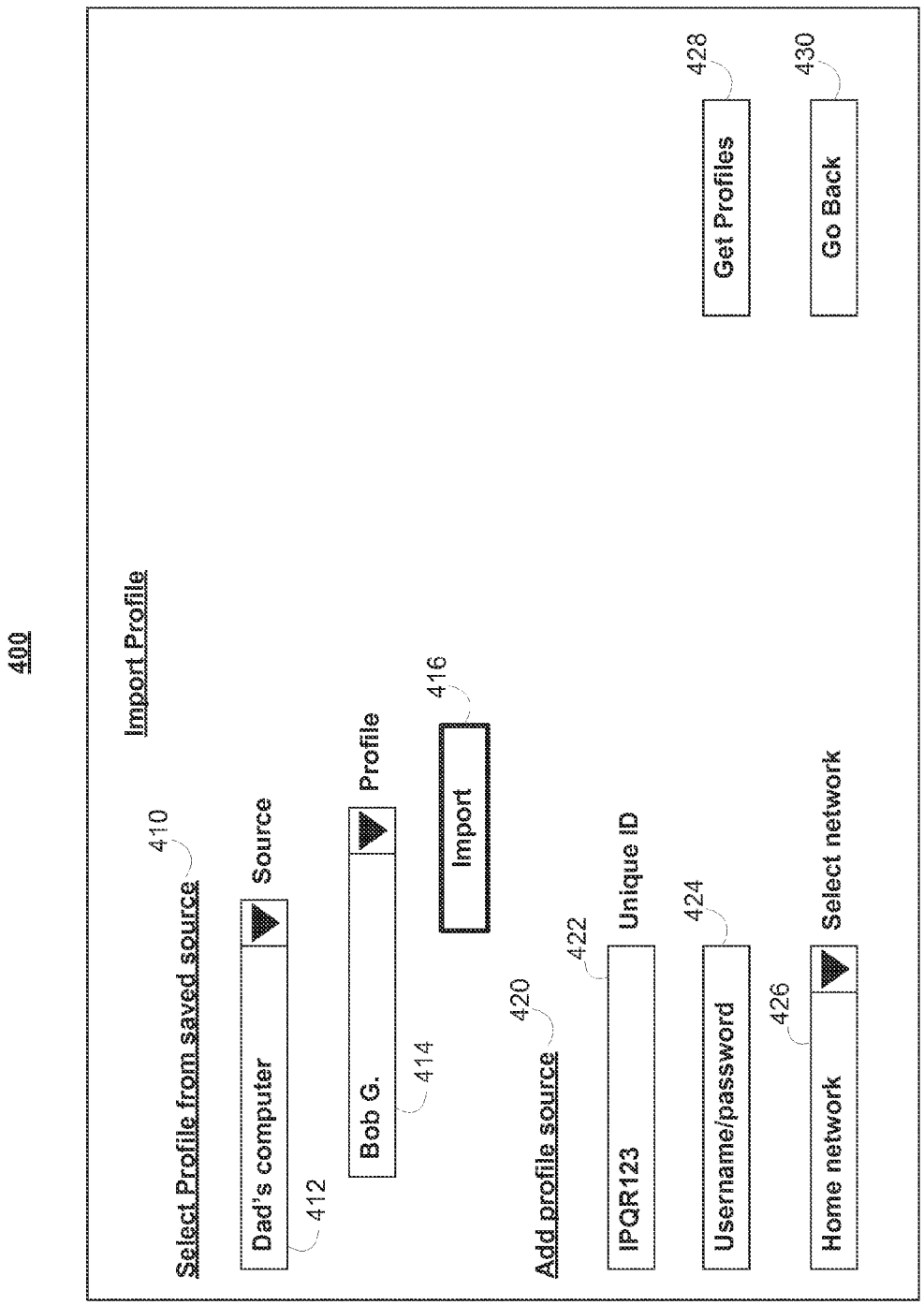
FIG. 4 shows an illustrative screen for importing user preferences from a remote source in accordance with an embodiment of the present invention.

As discussed above in connection with FIG. 2, a user may select import profile option 260 to retrieve a viewer preference profile from a remote source which may be media source 120 (FIG. 1). The profile received from the remote source may be added to the group of viewers. FIG. 4 shows an illustrative screen 400 for importing user preferences from a remote source in accordance with an embodiment of the present invention.

Import profile screen 400 includes options 410 to retrieve a saved preference profile from a saved remote source and options 420 to add a preference profile remote source to the system. A remote source that was previously used to retrieve a preference profile may be identified by name. For example, a drop-down menu 412 may be provided allowing the user to select a previously used remote source. In particular, a preference profile may have previously been retrieved from a remote source such as a remote computer and that source may be named "Dad's computer." The user may select this previously used source from the drop-down menu 412 and be able to select other preference profiles available through that remote source.

A preference profile selection drop-down menu 414 may be provided allowing the user to import a preference profile from the source identified by drop-down menu 412. In particular, once the user selects a particular remote source from drop-down menu 412, the control circuitry 118 may automatically communicate with the selected remote source and retrieve a list of preference profiles that are available through that remote source. This list is compiled and made available for selection using reference profile selection drop-down menu 414. Upon selection of the import profile option 416, the system retrieves the preference profile data structure from remote source identified by drop-down menu 412 corresponding to the profile identified by drop-down menu 414. The preference profile data structure is stored locally on the user equipment device 110 and made available for selection into the group through group viewer selection screen 200.

If a particular remote source is not available for selection through drop-down menu 412, the user may add a remote source through options 420. For example, if a new friend arrives at a household, that friend's preference profiles may only be available from a remote source (i.e., the remote source corresponding to the friend's system). Accordingly, the household system may have to be configured with the remote source information associated with the new friend in order to retrieve the friend's preference profile.

Remote source configuration options 420 may include a unique identifier input field 422. Unique identifier input field 422 may represent the unique location of the remote source. The control circuitry 118 may use the information that is input into unique identifier input field 422 to find and communicate with the appropriate remote source. For example, unique identifier input field 422 may correspond to an IP address of a remote computer, a web site name or address, a unique set-top box identifier, computer name, or any other remote system location identification information. It should be understood that unique identifier input field 422 may include multiple fields depending on the type of unique identifier needed to reach a particular remote source. In some implementations when the unique ID field 422 is a web site name, the control circuitry 118 may run a search engine through the Internet (e.g., using Google's search engine) to find the IP address or web site address of the specified web site name. The control circuitry 118 may present a variety of hits associated with the web site name for user selection. The control circuitry 118 may then communicate with a user selected matching web site hit to retrieve preference profiles from that remote source.

A remote source identified by unique identifier input field 422 may require login information in order to provide access to the preference profiles stored on the remote source. Accordingly, the user may specify a username and/or password in fields 424 to enable the system to access preference profiles stored on the remote source. The user may also select a particular network that corresponds to the unique identifier input field 422 through drop-down menu 426. For example, if the remote source is another set-top box or computer inside of the household, the unique identifier may be the computer name that contains the preference profiles and the network may be the local home network where the local system resides. The control circuitry 118 may limit its search for the remote source identified by unique identifier input field 422 to the remote sources present on the network identified by field 426.

The user may select the get profiles option 428 to instruct the control circuitry 118 to search or communicate with the remote source identified by unique identifier input field 422. Once the remote source is found, the control circuitry 118 may retrieve the preference profile information from that remote source and allow the user to select one or more of the preference profiles. The selected preference profiles may then be received by the local system (e.g., user equipment device 110) and the user may add the selected profiles to the group. In some embodiments, once the remote source is found and successfully communicated with, the control circuitry 118 may automatically add that source to the saved remote sources list. The control circuitry 118 may name that remote source and allow the user to select that source from drop-down menu 412. This may make it unnecessary for the user to input the remote source location information when the user desires to access or retrieve other preference profiles from that same remote source.

When the user is done importing preference profiles from the remote source, the user may select go back option 430 to return to the previous screen. For example, selection of go back option 430 may return the user to the group viewer selection screen 200.

After the control circuitry 118 computes the individual and group preference values for assets in the selected genre, a display is provided representing the individual preference values and the group preference value. This display allows the group of viewers to easily identify which assets would be most relevant for the group and why various assets are not as relevant.

FIG. 7 shows an illustrative display 700 in accordance with an embodiment of the present invention. Display 700 may include a list of assets 710, a relevance indicator 720 representing individual preference values and a group preference value for assets, group value indicator 740, alert indicators 730, unique individual viewer identifiers 750 and a suggest option 760.

List of assets 710 may be displayed in order in accordance with their relevance to the group of viewers. For example, an asset title 714 may appear at the top of the list of assets 710 indicating that it is more relevant to the group of viewers than the assets that appear below the asset title 714. In particular, asset title "Contact" which is associated with a movie asset is displayed at the top of the list of asset 710 indicating that it is the most relevant asset to the group that was found by the system. On the other hand, the asset title "Gladiator" which is associated with a movie asset is displayed at the bottom of the list of assets 710 indicating that it is least relevant to the group of viewers. When there are more assets ranked than can be provided in the display, a scroll bar 712 may be provided. The user may scroll down using scroll bar 712 to view assets that are ranked as being less relevant than the assets provided in the display. Alternatively, when viewing the least relevant asset in the list, the user may use scroll bar 712 to scroll up to view assets which are more relevant than the assets present in the display.

Although display 700 shows asset lists 710 on one side of the screen and the corresponding indicators 720 on the other, it should be understood that alternate display arrangements may be provided. For example, asset lists 710 may be excluded by including the title of the assets in list 710 within the indicator. This may enable control circuitry 118 to display indicators 720 without asset lists 710 and the same information will be conveyed to the user. This may be preferred in a mobile application context where the screen size is limited. Similarly, other portions of display 700 may be excluded or provided in other forms suitable for the user's device.

An indicator 720 may be provided adjacent each asset title in the list of asset 710 to visually indicate to the user the relevance of each asset to the group and to the individuals in the group. Indicator 720 may be in the form of a horizontal (or vertical) bar having a particular length that corresponds to the group preference value. The bar may be subdivided into sections 722, 724 and 726, each section indicating the relevance of the asset to the individuals in the group. In particular, each section of the bar may have an associated length that corresponds to an individual's preference value. The sum of the individual preference value may be equal to the value of the group preference value.

Each section 722, 724 or 726 may have a visual indicator that informs the user which viewer the particular section 722, 724 or 726 corresponds to. The visual indicator may be in the form of a color, a unique shade, a unique hash mark, or any other suitable unique visual indicator. A visual indicator map or key 750 may be provided to allow the user to match the indicator provided in section 722, 724 or 726 with the viewer profile in the group. For example, the identifier provided in section 722 may be diagonal lines and map 750 indicates that the diagonal lines are used to represent viewer Dad.

In some embodiments, the visual indicator in section 722, 724 or 726 may be the particular's viewers icon 212. For example, instead of coloring a particular section 722, 724 or 726 with a color unique to a particular viewer and matching that color by way of map 750, the viewer's icon 212 may be displayed within the viewer's respective horizontal bar section 722, 724 or 726. Since the viewers are readily familiar with their respective icons 212, each viewer can determine their individual preference value associated with the asset in list of assets 710, by finding their respective icon 212 displayed in a section of the indicator 720 and comparing their respective bar length section with the length of the entire bar. Alternatively, a numerical value may be provided alongside the icon 212 with each section 722, 724 or 726 indicating to each viewer that viewer's individual preference value for the asset.

Each viewer in the group can also compare their particular individual preference value for the most relevant asset with their individual preference value in a less relevant asset. The viewer may potentially use this information at a future time access a particular asset which may appear to be more relevant than other assets to the group but may be less relevant to the particular viewer than another asset in the list. Each viewer may use indicator 720 to compare the relevance of asset 714 to a particular individual viewer relative to other members of the group.

Displaying indicator 720 which corresponds to one asset side-by-side with another indicator 720 which corresponds to another asset may enable viewers in the group to visually identify one asset as being more relevant to the group and to the individuals within the group relative to another asset. For example, control circuitry 118 may identify a particular asset as being most relevant to the group of viewers even though the asset may have little or no relevance to a particular viewer in the group. In particular, if there are three viewers in the group and two of the viewers are Ultimate Fighting fanatics while a third of the viewers in the group has a dislike for Ultimate Fighting, control circuitry 118 may nevertheless indicate an Ultimate Fighting asset as being the most relevant to the group of three viewers. The viewers see the indicator 720 associated with the Ultimate Fighting asset as being longer (indicating more relevance) than other indicators associated with different assets. However, the indicator 720 associated with the Ultimate Fighting asset also contains information representing the small relevance of the asset to the third viewer (who does not like Ultimate Fighting) (i.e., the indicator portion 722 representing the third viewer's preference value).

The viewers may see another indicator 720 that may have a reduced relevance to the group of three viewers (i.e., indicator representing a lower group preference value) than the Ultimate Fighting asset but may have an increased relevance to the third viewer (who does not like Ultimate Fighting) (i.e., indicator portion representing a higher individual preference value). Accordingly, instead of blindly selecting for access the asset identified by control circuitry 118 mathematically as most relevant to the group (e.g., the Ultimate Fighting asset) but which has little relevance to the third viewer, the users may select for access an asset having lower overall relevance to the group but that has substantially increased relevance to the third viewer. This will accommodate all of the viewer's preferences and interests. In one or more embodiments, a lower threshold for preference may be set so that no asset will be displayed which does not meet a minimum preference level for all viewers or an identified subset of viewers. In some embodiments, this minimum preference level is not a determinant of whether the asset will be recommended but rather its ranking in the overall recommendations. In these embodiments, an asset that does not meet minimum preference thresholds for all users will be penalized in its overall ranking score and ranked accordingly with respect to other assets. In this way, an asset may be ranked higher based on its balanced appeal to all users than an asset that is ranked very highly but only relative to a subset of users. The system may display a best compromise indicator that identifies the asset that is ranked higher based on its balanced appeal to all users.

As an example, as shown in display 700, the asset entitled "Contact" has an indicator 720 representing the asset as being most relevant to the group because it is highly relevant to viewers Stewie and Lauren corresponding to the second and third indicator portions 724 and 726 and a low relevance to viewer Dad corresponding to the first indicator portion 722. The users may visually compare the first indicator 720 that is associated with "Contact" with a second indicator 720 associated with the asset entitled "Producers" and conclude that although the second indicator represents a lower group preference value than the first indicator, the second indicator portion corresponding to viewer Dad may represent a larger individual preference value for viewer Dad than viewer Dad's first indicator portion. Thus, the users may select to access "Producers" instead of "Contact" because it would lead to a more enjoyable experience to all of the viewers in the group and not just the majority (which would be the case for "Contact").

A group preference value indicator 740 may be provided alongside the indicator 720. Group preference value indicator 740 may indicate the computed group preference value for the asset in the list of assets 710. The value provided by group preference value indicator 740 may correspond to the length of indicator 720. Accordingly, a longer bar may have a larger group preference value associated with it indicating greater relevance or in some implementations a smaller group preference value indicating greater relevance.

Alerts indicator 730 may be provided to alert the viewers that for one or more of the ranked assets, a hard limit, minimum preference threshold, or parental control, associated with one of the viewers in the group, has been exceeded. For example, although asset 714 entitled "Gladiator" has been ranked as being relevant to the group, an alert is provided alerting the viewers that the asset has asset characteristics that meets or exceeds a parental control limit setting 732 in one of the viewer preference profiles in the group. Additionally, hard limit value alert 734 associated with asset 714 entitled "Gladiator" indicates that the asset characteristic corresponding to language has exceeded a hard limit set in one of the viewer preference profiles. Additional alerts 730 may be provided if other hard limits in the preference profiles are exceeded. If there is lack of space available in the display screen, a scroll bar (not shown) may be provided to allow the user to scroll left or right to view other alerts 730 that have been detected. In some embodiments, at least a happy and a sad icon for each user or a happy or sad thumbnail photo for each viewer is stored and these are used to indicate visually the relevance of each asset to each of the users in the group. For example, in such embodiments, in addition to or alternatively to displayed asset indicator 720, an emotion depicting icon (or emoticon) for each user may be used. Other expressions may include ambivalence, confusion, or anger (e.g., which may be used if a limit is exceeded).

The user may position cursor 240 over the particular alert 730 to view which viewer (and viewer preference characteristic) has a preference characteristic that has been exceeded. For example, as shown in FIG. 8, the user has positioned the cursor over the language alert 734 that has been indicated for asset entitled "Producers." In response to a user selection of that alert (or alternatively automatically as the cursor is positioned over the alert), a pop-up window 800 may be displayed. Pop-up window 800 may include information about which viewer's preference characteristic has been exceeded. For example, pop-up window 800 may display the viewer's name (e.g., "Stewie") and the characteristic (e.g., language) that has a hard limit value set that is exceeded. If multiple viewer's have the same characteristic with a hard limit value that is exceeded, each of those viewers' names or identifiers (e.g., icons 212) may also be displayed in the same pop-up window 800.

A view profiles option 780 may also be provided in display 700. Selection of view profiles option 780 navigates the user to equalizer 300 (FIG. 3). Equalizer 300 may include a list of all the viewers in the group and the user may see each viewer's preference characteristics. Selection of the escape option 370 (FIG. 3) may navigate the user back to display 700.

An edit profiles option 782 may also be provided in display 700. Selection of edit profiles option 782 navigates the user to equalizer 300 (FIG. 3). The user may modify one or more of the preference characteristics for the viewers in the group. In response to the modification, the system automatically re-computes all of the individual preference values for each of the assets in the list 710 and all of the group preference values for each of the assets in the list 710. The system may display a resorted and recomputed list of assets 710. The newly displayed list of assets 710 may be different from the previously displayed list that may have changed due to the modification of the preference characteristic in the preference profile.

A remove (or temporarily remove) profile from group option 770 may be provided in display 700. Selection of option 770 may prompt the user to select one or more profile to remove from the individual and group preference value computation and cause the system to update the asset indicators. For example, FIG. 9 shows an illustrative display 900 where the user has selected the option to remove the preference profile associated with viewer "Dad" from the asset recommendation computations.

Upon selection of the preference profiles to remove from the asset recommendations, the system updates the individual and group preference values. In particular, the asset lists presented in display 900 have indicators that are associated with the remaining members of the group (e.g., Stewie and Lauren). The indicators may represent the individual and group values in a similar manner as was discussed in connection with display 700. In particular, the indicators may have sections that correspond to each individual viewer of the group. Each section may represent the value for each viewer by way of a particular color, shade, icon or other suitable form.

As shown in display 900, an asset that was ranked as having little or no relevance to the group when the group had three members in display 700 now appears as being relevant. In particular, the asset entitled "Braveheart" which was excluded from the display provided when group member "Dad" was included in the group is now ranked as relevant to the group in which "Dad" is not a member. This asset may have previously been excluded because it either exceeded some preference characteristics that the preference profile associated with member "Dad" included.

For example, the preference profile for member "Dad" may have had a higher priority designation than the other members of the group. Accordingly, because of the priority designation the system may have excluded assets that don't match this particular member's preference but that do match other members' preferences in the group.

Additionally, a different alert is provided for the group corresponding to the ratings characteristic. In particular, one of the two members of the group may have a preference characteristic for ratings having a hard limit which the asset exceeds. Accordingly, the system displays an alert that corresponds to that particular characteristic for the asset which has an asset characteristic that exceeds the hard limit set in the viewer's preference profile. In general, in some embodiments, assets that exceed hard limits or violate one or more viewers' parental control settings, or which fall below a minimum acceptable preference threshold may have their overall ranking score penalized for this violation resulting in a different placement in the ranked recommendations list.

Referring back to FIG. 7, an add profile to group option 772 may also be provided in display 700. Selection of option 772 may prompt the user to select a new profile to add to the group and the system may re-compute the asset recommendations taking into account the newly added viewer's preference profile characteristics. The system may provide a display having a new list of assets with indicators 720 which are associated with the new group. For example, if the previous group had three members and one member was added using option 772, the system will search and compute the individual and group preference values for the four member group. The indicators will have four sections, one for each member of the group, instead of the previous three sections. The group total preference value indicator may also correspond to a larger value since more members are present in the group.

A create group profile option 774 may also be provided in display 700. Selection of option 774 may create a preference profile based on all of the preferences of the members in the group. Accordingly, at a future time, instead of manually having to select various members to add to a group and then perform a search for assets to recommend, the user may simply select a group profile and perform a search based on the selected group profile. In some embodiments, the group profile may have a name and icon associated with it to represent all the members in the group.

In some implementations, the system may simply create a named group link to each of the preference profiles in the group. Upon selection of the group link, the system may automatically add all of the members' preference profiles that are linked to a group in order to perform a search for assets to recommend. This automates the preference profile selection aspect and makes asset recommendations more efficient.

In some embodiments, the group profile may be stored to a remote source or location. Thus, when the group of viewers is located at a different place, they can simultaneously retrieve all of the preferences by selecting to import the group profile. For example, a group of friends may thereby access assets together at different locations at different times. In particular, each time the particular group of friends wishes to have assets recommended, they simply have to import their group profile from the remote source irrespective of their present location.

When the group preference profile is retrieved, it can be modified using equalizer 300 (FIG. 3) in a manner that is similar to the way that individual preference profiles can be modified. In some embodiments, multiple groups each having their own group preference profile may join together to access assets. Accordingly, a group may be formed, as discussed above in connection with FIG. 2, by using profile selection 210 (FIG. 2) and selecting the distinct group preference profiles. The group preference profiles account for the preferences of all of the individuals in each of the distinct groups. The system may then provide asset recommendations based on the preferences of the multiple group profiles that are selected for the group. Such a tool may be useful for a family such as the Brady bunch which may have three distinct group profiles defined, one for the three girls, one for the three boys, and one for the parents and Alice. When the entire family wishes to watch a program together, they may combine the profiles together.

Referring back to FIG. 7, a suggest option 760 may be provided. Selection of suggest option 760 may instruct the system to pick the asset most relevant to the group. In some embodiments, the system selects for access the first asset listed in the asset list 710 in response to selection of suggest option 760. This is because the assets may be listed in order of relevance with the first asset being the most relevant. In other embodiments, if the first asset has an alert associated with it but is ranked as most relevant, the system may select for access the next most relevant asset that does not have an alert in response to receiving a selection of suggest option 760. In other embodiments, the system may pick an asset that provides the most balanced appeal to all or a subset of the viewers in a group.

The system may display the title of the asset selected in response to the suggest option 760. Alternatively, the system may play a short clip associated with the asset allowing the users to view a preview in response to selection of suggest option 760. Alternatively, the system may automatically purchase (e.g., by placing an order with the appropriate entity) the most relevant asset in response to receiving a selection of suggest option 760.

Figure 10:
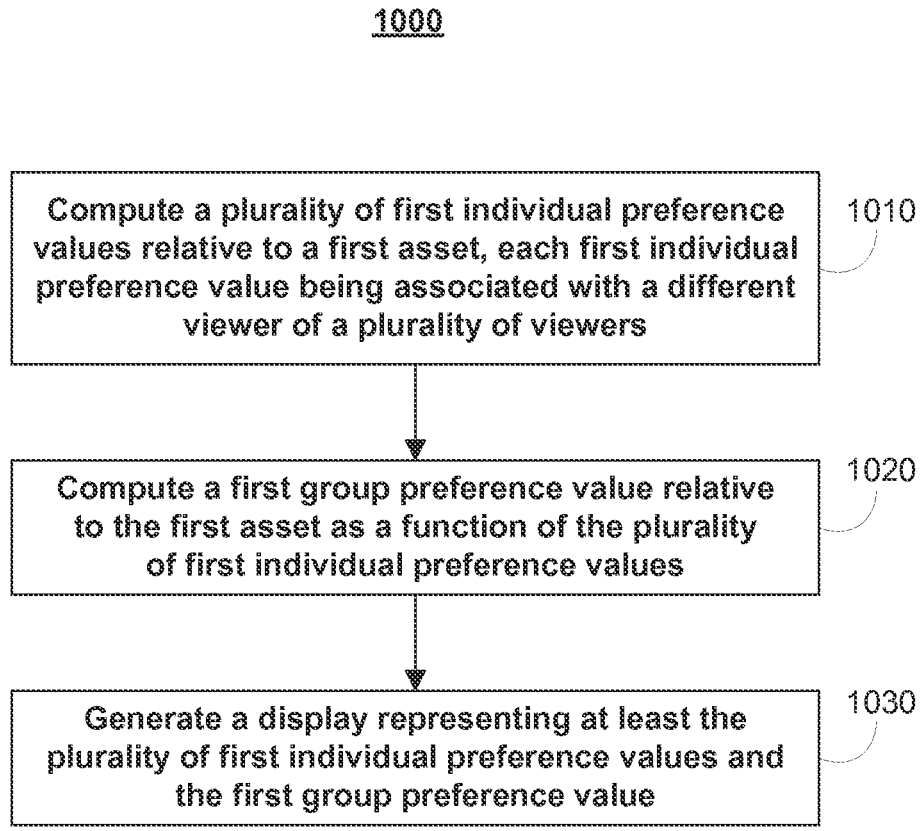
FIG. 10 illustrates a method of generating a display representing individual and group preference values in accordance with an embodiment of the present invention.

FIG. 10 illustrates a method 1000 of generating a display representing individual and group preference values in accordance with an embodiment of the present invention. At step 1010, a plurality of first individual preference values are computed relative to a first asset. Each first individual preference value is associated with a different viewer of the plurality of viewers.

For example, FIG. 5 shows preference profile data structure 500 that contains preferences for a particular viewer that may be selected to be part of a group of viewers. Control circuitry 118 (FIG. 1) retrieves these preferences and computes a preference value associated with the viewer to which the preference profile corresponds by, for example, computing the Euclidean distance between the viewer's preferences and characteristics of an asset. The asset characteristics may be retrieved by control circuitry 118 from asset characteristics data structure 600 (FIG. 6). Control circuitry 118 may perform these individual preference value computations for each viewer that is selected to be part of the group. The individual preference value for each viewer in the group may be stored in a local or remote memory of the system.

At step 1020, a first group preference value is computed relative to the first asset as a function of the plurality of first individual preference values. For example, control circuitry 118 may perform a function based on the individual preference values for each viewer in the group and compute a group preference value. The function performed may be a sum, a difference (assuming the individual preference values were retained in vector form), a Euclidean distance, a multidimensional centroid or middleground, or any other suitable measure relative to a group. The group preference value may be stored in a local or remote memory of the system.

At step 1030, a display is generated representing at least the plurality of first individual preference values and the first group preference value. For example, control circuitry 118 (FIG. 1) may retrieve the individual and group preference values and generate a display that includes an indicator that indicates to the user both the individual preference values and group preference value for a particular asset.

Figure 11:
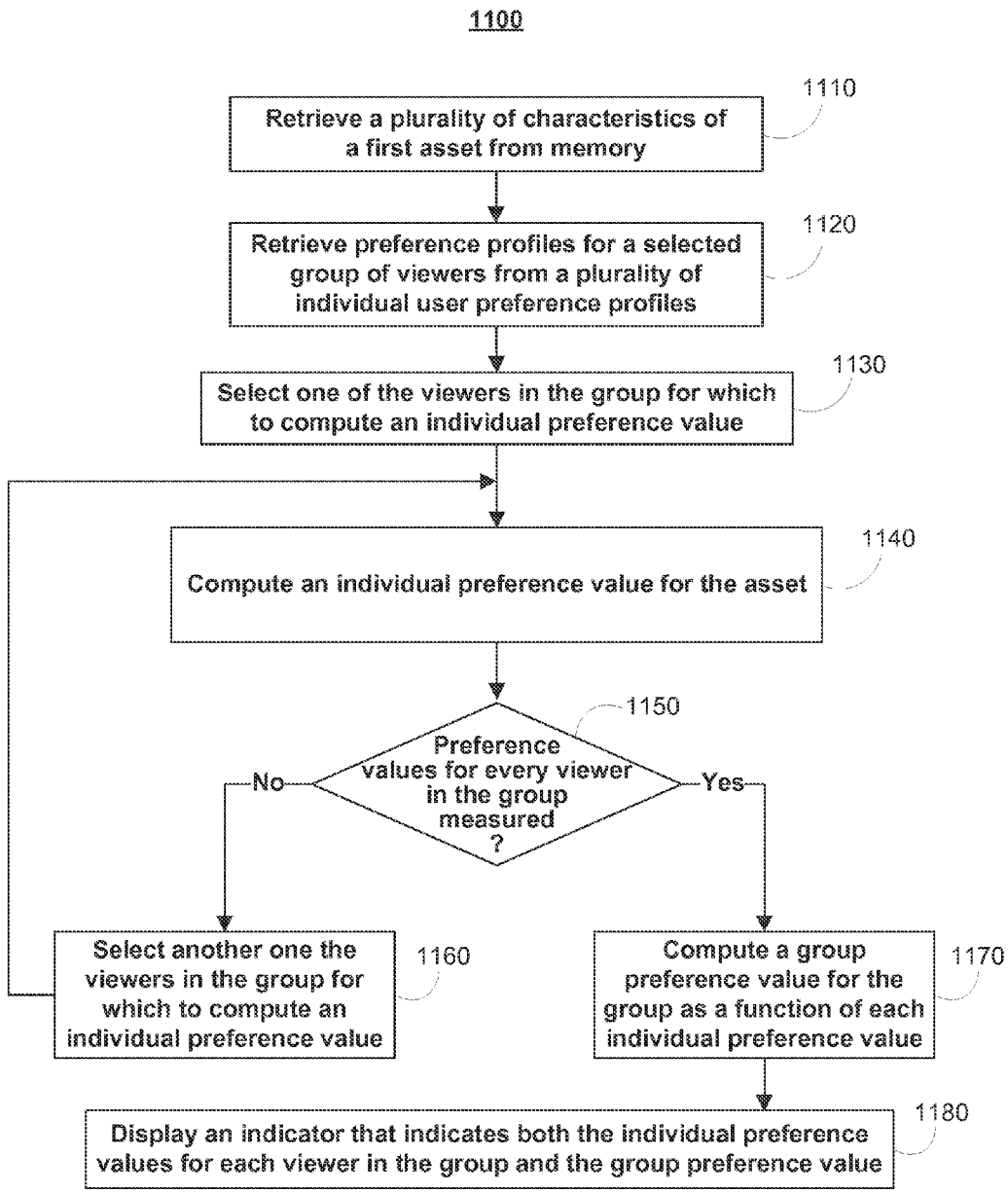
FIG. 11 illustrates a method of computing a group preference value in accordance with an embodiment of the present invention.

FIG. 11 illustrates a method 1100 of computing a group preference value in accordance with an embodiment of the present invention. At step 1110, a plurality of characteristics of a first asset are retrieved from a memory. For example, control circuitry may retrieve asset characteristics from a memory that stores asset characteristics data structure 600 (FIG. 6).

At step 1120, preference profiles for a selected group of viewers are retrieved from a plurality of individual user preference profiles available within a system. For example, a user may select any number of viewer's profiles 210 to add to a particular group 230 (FIG. 2). Each profile may be identified by a particular name or icon associated with a particular viewer. The preference profiles may be retrieved from a remote source and added to the group. Each preference profile may be created or modified using equalizer 300 (FIG. 3).

At step 1130, one of the viewers in the group is selected for which to compute an individual preference value. For example, control circuitry 118 may identify a particular viewer that is part of the group and retrieve from a memory that viewer's preference profile data structure 500 (FIG. 5).

At step 1140, an individual preference value is computed for the selected viewer relative to the asset as a function of the viewer's profile preference data and the asset's characteristic values. For example, a vector individual preference value may be formed by considering the asset's characteristic values to be a point (or n-tuple) in an n-dimensional space and the individual viewer's profile data values to be another point (or n-tuple) in the same n-dimensional space and computing the vector by subtracting the second n-tuple from the first to form a difference vector. Alternatively, an absolute scalar individual preference value may be determined by computing the Euclidean distance between the point representing the selected viewer's preference values and the corresponding asset characteristics values by computing the square root of the sum of the squares of the differences between the preference values in each characteristic dimension (e.g., violence or sex) and their corresponding asset characteristics. For example, control circuitry 118 may perform a computation to determine the Euclidean distance between each one of the viewer's preferences stored in the viewer's preference profile data structure 500 and the its corresponding asset characteristic retrieved from asset characteristics data structure 600.

At step 1150, a determination is made as to whether individual preference values for every viewer in the group have been determined. For example, control circuitry 118 may determine whether all of the viewers that are in the group have individual preference values computed. If there are viewers for which the individual preference value has not been computed, the system selects another viewer in the group for which to compute an individual preference value at step 1160 otherwise the system performs step 1170.

At step 1170, a group preference value is computed for the group as a function of each individual preference value. For example, control circuitry 118 may perform a function based on the individual preference values for each viewer in the group and compute a group preference value. If the vector individual preference values were computed at step 1140, the function performed may be the absolute value of a vector sum of the individual preference values. Alternatively, if scalar individual preference values were computed at step 1140, then the function may be a scalar sum. Other computations may be substituted for the operations of steps 1140 and 1170 as would be appreciated by one skilled in the art, including but not limited to a multidimensional centroid, center of gravity, bounded centroiding with or without cutouts or exclusions, weighted distancing, morphed or curved space distancing, or middleground, or any other suitable measure relative to a group. The group preference value may be stored in a local or remote memory of the system.

At step 1180, an indicator is displayed that indicates both the individual preference values for each viewer in the group and the group preference value. For example, control circuitry 118 may generate display 700 (FIG. 7) that includes an indicator corresponding to an asset that indicates to a user both the individual preference values for each member of the group and the group preference value. Control circuitry 118 may also sort the assets displayed in display 700 according to their relevance to the group of viewers. The user may use the information contained in the indicator to select the asset most relevant to the group of viewers.

The above described embodiments of the present invention are presented for purposes of illustration and not of limitation, and the present invention is limited only by the claims which follow.

What is claimed is:

1. A method for providing asset recommendations for a group, the method comprising:
   generating, using control circuitry, a display including an identifier for an asset;
   determining a first individual preference value relative to the asset for a first viewer and a second individual preference value relative to the asset for a second viewer;
   computing a group preference value relative to the asset based on the first and the second individual preference values; and
   generating, for inclusion in the display, a representation of the first and the second individual preference values and the group preference value for the asset, wherein the first and the second individual preference values are visually distinguished from the group preference value.

2. The method of claim 1 wherein each of the first and second individual preference values is a vector individual preference value and wherein computing the group preference value comprises performing a vector sum of the first and second individual preference values.

3. The method of claim 2, wherein each of the first and second individual preference values comprises a set of magnitudes, each magnitude of the set of magnitudes corresponding to a difference between a characteristic value setting associated with the first or second viewer and a characteristic value associated with the asset.

4. The method of claim 1 further comprising:
   generating for display an equalizer for at least the first viewer, the equalizer comprising an initial asset characteristic value setting representing an initial preference relative to an asset characteristic for the first viewer; and
   receiving a user input modifying the initial asset characteristic value setting of the equalizer to create a new asset characteristic value setting representing the first viewer's new preference relative to the asset characteristic.

5. The method of claim 1 further comprising:
   searching a plurality of preference profiles to identify at least two preference profiles having one or more similar asset characteristic values; and
   providing a recommendation to form a group that includes the identified at least two preference profiles.

6. The method of claim 1 further comprising combining a plurality of preference profiles to form at least two subject matter specific groups, each subject matter specific group including at least two of the plurality of preference profiles, wherein:
   a first plurality of assets having a first subject matter are identified as relevant to a first of the at least two subject matter specific groups, and
   a second plurality of assets having a second subject matter different from the first subject matter are identified as relevant to a second of the at least two subject matter specific groups.

7. The method of claim 1 further comprising:
   monitoring viewing behavior of at least the first viewer to determine the first viewer's preference relative to an asset characteristic; and
   computing the first viewer's individual preference value relative to the asset based on the first viewer's monitored viewing behavior.

8. The method of claim 1 further comprising:
   retrieving the first viewer's local preferences relative to a first asset characteristic from a first memory of a first user equipment device; and
   receiving the first viewer's remote preferences relative to the first asset characteristic from an external source, wherein the first viewer's first individual preference values are computed based on the local and remote viewer preferences relative to each asset.

9. The method of claim 1, wherein the display comprises a best compromise identifier, the best compromise identifier identifying an asset from a list of assets that features a most balanced appeal to all viewers in the group.

10. The method of claim 1 wherein the computing the first and second individual preference values comprises:
    adjusting a weight for each viewer such that the weight adjustment indicates priority when computing the first individual preference values; and
    modifying the computed preference values for viewers as a function of the weight adjustments.

11. A system for providing asset recommendations for a group, the system comprising:
    control circuitry configured to:
      generate a display including an identifier for an asset;
      determine a first individual preference value relative to the asset for a first viewer and a second individual preference value relative to the asset for a second viewer;
      compute a group preference value relative to the asset based on the first and the second individual preference values; and
      generate, for inclusion in the display, a representation of the first and the second individual preference values and the group preference value for the asset, wherein the first and the second individual preference values are visually distinguished from the group preference value.

12. The system of claim 11 wherein each of the first and second individual preference values is a vector individual preference value and wherein the control circuitry is configured to compute the group preference value by performing a vector sum of the first and second individual preference values.

13. The system of claim 12, wherein each of the first and second individual preference values comprises a set of magnitudes, each magnitude of the set of magnitudes corresponding to a difference between a characteristic value setting associated with the first or second viewer and a characteristic value associated with the asset.

14. The system of claim 11, wherein the control circuitry is further configured to:
   generate for display an equalizer for at least the first viewer, the equalizer comprising an initial asset characteristic value setting representing an initial preference relative to an asset characteristic for the first viewer; and
   receive a user input modifying the initial asset characteristic value setting of the equalizer to create a new asset characteristic value setting representing the first viewer's new preference relative to the asset characteristic.

15. The system of claim 11, wherein the control circuitry is further configured to:
   search a plurality of preference profiles to identify at least two preference profiles having one or more similar asset characteristic values; and
   provide a recommendation to form a group that includes the identified at least two preference profiles.

16. The system of claim 11, wherein the control circuitry is further configured to combine a plurality of preference profiles to form at least two subject matter specific groups, each subject matter specific group including at least two of the plurality of preference profiles, wherein:
   a first plurality of assets having a first subject matter are identified as relevant to a first of the at least two subject matter specific groups, and
   a second plurality of assets having a second subject matter different from the first subject matter are identified as relevant to a second of the at least two subject matter specific groups.

17. The system of claim 11, wherein the control circuitry is further configured to:
   monitor viewing behavior of at least the first viewer to determine the first viewer's preference relative to an asset characteristic; and
   compute the first viewer's individual preference value relative to the asset based on the first viewer's monitored viewing behavior.

18. The system of claim 11, wherein the control circuitry is further configured to:
   retrieve the first viewer's local preferences relative to a first asset characteristic from a first memory of a first user equipment device; and
   receive the first viewer's remote preferences relative to the first asset characteristic from an external source, wherein the first viewer's first individual preference values are computed based on the local and remote viewer preferences relative to each asset.

19. The system of claim 11, wherein the display comprises a best compromise identifier, the best compromise identifier identifying an asset from a list of assets that features a most balanced appeal to all viewers in the group.

20. The system of claim 11 wherein the control circuitry is configured to compute the first and second individual preference values by:
   adjusting a weight for each viewer such that the weight adjustment indicates priority when computing the first individual preference values; and
   modifying the computed preference values for viewers as a function of the weight adjustments.

* * * * *